US011039139B2

(12) United States Patent
Zhao et al.

(10) Patent No.: US 11,039,139 B2
(45) Date of Patent: Jun. 15, 2021

(54) METHOD AND APPARATUS FOR IDENTITY TRANSFORM IN MULTIPLE TRANSFORM SELECTION

(71) Applicant: TENCENT AMERICA LLC, Palo Alto, CA (US)

(72) Inventors: Xin Zhao, San Diego, CA (US); Xiang Li, Los Gatos, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/393,289

(22) Filed: Apr. 24, 2019

(65) Prior Publication Data

US 2020/0092555 A1 Mar. 19, 2020

Related U.S. Application Data

(60) Provisional application No. 62/731,773, filed on Sep. 14, 2018.

(51) Int. Cl.
*H04N 11/02* (2006.01)
*H04N 19/122* (2014.01)
(Continued)

(52) U.S. Cl.
CPC ......... *H04N 19/122* (2014.11); *H04N 19/176* (2014.11); *H04N 19/18* (2014.11); *H04N 19/625* (2014.11)

(58) Field of Classification Search
CPC .... H04N 19/122; H04N 19/176; H04N 19/18; H04N 19/625
(Continued)

(56) References Cited

U.S. PATENT DOCUMENTS 6,668,089 B1 * 12/2003 Bracamonte ......... H04N 19/176
382/239
2013/0188692 A1 * 7/2013 Chiu .................... H04N 19/154
375/240.03
(Continued)

FOREIGN PATENT DOCUMENTS

WO 2015/042751 A1 4/2015
WO 2016/064862 A1 4/2016

OTHER PUBLICATIONS

International Search Report in International Application No. PCT/US2019/049078, dated Nov. 7, 2019.
(Continued)

*Primary Examiner* — Jayanyi K Patel
*Assistant Examiner* — Richard B Carter
(74) *Attorney, Agent, or Firm* — Sughrue Mion, PLLC

(57) ABSTRACT

A method of controlling residual coding for decoding or encoding of a video sequence, is performed by at least one processor and includes determining whether to replace a transform type of Multiple Transform Selection (MTS) by using Identity transform (IDT), based on whether either one or both of a block height and a block width meet a predetermined condition; and based on either one or both of the block height and the block width meeting the predetermined condition, replacing the transform type of MTS by using the IDT and keeping a syntax of the MTS unchanged, and the IDT is a linear transform process using an N×N transform core in which each coefficient is non-zero along a diagonal position, and wherein N is an integer.

20 Claims, 12 Drawing Sheets

(51) Int. Cl.
*H04N 19/625* (2014.01)
*H04N 19/18* (2014.01)
*H04N 19/176* (2014.01)

(58) Field of Classification Search
USPC .................. 375/240.18, 240.03; 382/239
See application file for complete search history.

(56) References Cited

U.S. PATENT DOCUMENTS

| | | |
|---|---|---|
| 2014/0003515 A1 | 1/2014 | Ohgose et al. |
| 2016/0029038 A1 | 1/2016 | Zhao et al. |
| 2016/0212446 A1 | 7/2016 | Liu et al. |
| 2018/0020218 A1* | 1/2018 | Zhao .................... H04N 19/176 |
| 2019/0306522 A1* | 10/2019 | Said ........................ G06F 17/16 |
| 2020/0021852 A1* | 1/2020 | Chao ...................... H04N 19/12 |

OTHER PUBLICATIONS

Written Opinion in International Application No. PCT/US2019/049078, dated Nov. 7, 2019.

\* cited by examiner

Computer System 900

METHOD AND APPARATUS FOR IDENTITY TRANSFORM IN MULTIPLE TRANSFORM SELECTION

CROSS-REFERENCE TO RELATED APPLICATION

This application claims priority from U.S. Provisional Patent Application No. 62/731,773, filed on Sep. 14, 2018, in the United States Patent and Trademark Office, which is incorporated herein by reference in its entirety.

BACKGROUND

1. Field

Methods and apparatuses consistent with embodiments relate to video coding, and more particularly, a method and an apparatus for applying identity transform in Multiple Transform Selection (MTS).

2. Description of Related Art

In High Efficiency Video Coding (HEVC), a coding tree unit (CTU) is split into coding units (CUs) by using a quadtree structure denoted as a coding tree to adapt to various local characteristics. A decision whether to code a picture area using inter-picture (temporal) or intra-picture (spatial) prediction is made at a CU level. Each CU can be further split into one, two or four prediction units (PUs) according to a PU splitting type. Inside one PU, the same prediction process is applied and relevant information is transmitted to a decoder on a PU basis. After obtaining a residual block by applying a prediction process based on the PU splitting type, a CU can be partitioned into transform units (TUs) according to another quadtree structure similar to the coding tree for the CU. One of key features of an HEVC structure is that it has multiple partition conceptions including CU, PU, and TU. In HEVC, a CU or a TU can only be square shape, while a PU may be square or rectangular shape for an inter predicted block. In a later stage of HEVC, some contributions proposed to allow rectangular shape PUs for intra prediction and transform. At a picture boundary, HEVC imposes implicit a quadtree split so that a block will keep quadtree splitting until a size fits the picture boundary.

In Versatile Video Coding (VVC), a quadtree plus binary tree (QTBT) structure removes concepts of multiple partition types, i.e., removes a separation of CU, PU and TU concepts, and supports more flexibility for CU partition shapes. In the QTBT block structure, a CU can have either a square or rectangular shape. As shown in FIG. 1A, a CTU is first partitioned by a quadtree structure. Quadtree leaf nodes are further partitioned by a binary tree structure. There are two splitting types, symmetric horizontal splitting and symmetric vertical splitting, in binary tree splitting. Binary tree leaf nodes are called CUs, and that segmentation is used for prediction and transform processing without any further partitioning. This means that a CU, a PU and a TU have the same block size in the QTBT coding block structure. In VVC, a CU sometimes consists of coding blocks (CBs) of different color components, e.g., one CU contains one luma CB and two chroma CBs in a case of P and B slices of a 4:2:0 chroma format, and a CU sometimes consists of a CB of a single component, e.g., one CU contains only one luma CB or just two chroma CBs in a case of I slices.

The following parameters are defined for a QTBT partitioning scheme.

CTU size: a root node size of a quadtree, the same concept as in HEVC
MinQTSize: a minimum allowed quadtree leaf node size
MaxBTSize: a maximum allowed binary tree root node size
MaxBTDepth: a maximum allowed binary tree depth
MinBTSize: a minimum allowed binary tree leaf node size In an example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to a CTU first to generate quadtree leaf nodes. The quadtree leaf nodes may each have a size from 16×16 (i.e., the MinQTSize) to 128×128 (i.e., the CTU size). If the leaf quadtree node is 128×128, it will not be further split by a binary tree because the size exceeds the MaxBTSize (i.e., 64×64). Otherwise, the leaf quadtree node could be further partitioned by the binary tree. Therefore, the quadtree leaf node is also a root node for the binary tree, and has the binary tree depth as 0. When the binary tree depth reaches MaxBTDepth (i.e., 4), no further splitting is considered. When the binary tree node has the width equal to MinBTSize (i.e., 4), no further horizontal splitting is considered. Similarly, when the binary tree node has the height equal to MinBTSize, no further vertical splitting is considered. The leaf nodes of the binary tree are further processed by prediction and transform processing without any further partitioning. The maximum CTU size may be 256×256 luma samples.

Portion (a) of FIG. 1A illustrates an example of block partitioning by using QTBT, and Portion (b) of FIG. 1A illustrates a corresponding tree representation. Solid lines indicate quadtree splitting and dotted lines indicate binary tree splitting. In each splitting (i.e., non-leaf) node of the binary tree, one flag is signaled to indicate which splitting type (i.e., horizontal or vertical) is used, where 0 indicates horizontal splitting and 1 indicates vertical splitting. For the quadtree splitting, there is no need to indicate the splitting type because quadtree splitting always splits a block both horizontally and vertically to produce 4 sub-blocks with an equal size.

In addition, the QTBT scheme supports an ability for a luma and a chroma to each have a separate QTBT structure. Currently, for P and B slices, luma and chroma CTBs in one CTU share the same QTBT structure. However, for I slices, a luma CTB is partitioned into CUs by a QTBT structure, and chroma CTBs are partitioned into chroma CUs by another QTBT structure. This means that a CU in an I slice consists of a coding block of a luma component or coding blocks of two chroma components, and a CU in a P or B slice consists of coding blocks of all three color components.

In HEVC, inter prediction for small blocks is restricted to reduce a memory access of motion compensation, such that bi-prediction is not supported for 4×8 and 8×4 blocks, and inter prediction is not supported for 4×4 blocks. In a QTBT of VVC, these restrictions are removed.

In addition to DCT-II and 4×4 DST-VII that are employed in HEVC, an Multiple Transform Selection (MTS), or as known as a Adaptive Multiple Transform (AMT) or Enhanced Multiple Transform (EMT), scheme is used for residual coding for both inter and intra coded blocks. The MTS uses multiple selected transforms from DCT/DST families other than current transforms in HEVC. Newly introduced transform matrices are DST-VII, DCT-VIII, DST-I and DCT-V. Table shows basis functions of a selected DST/DCT.

TABLE 1

Transform basis functions of DCT-II/V/VIII and DST-I/VII for N-point input

| Transform Type | Basis function $T_i(j)$, $i, j = 0, 1, \ldots, N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$<br>where $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$,<br>where $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

To keep an orthogonality of a transform matrix, transform matrices are quantized more accurately than transform matrices in HEVC, with 10-bit representation instead of 8-bit in HEVC. To keep intermediate values of transformed coefficients within a range of 16-bit, after horizontal and after vertical transform, all the coefficients are right shifted by 2 more bits, comparing to a right shift used in current HEVC transforms.

The AMT applies to CUs each with both width and height smaller than or equal to 64, and whether AMT applies or not is controlled by a CU level flag. When the CU level flag is equal to 0, DCT-II is applied in a CU to encode a residue. For a luma coding block within an AMT enabled CU, two additional flags are signaled to identify the horizontal and vertical transform to be used. As in HEVC, a residual of a block can be coded with a transform skip mode in VVC. To avoid a redundancy of syntax coding, a transform skip flag is not signaled when a CU level AMT flag is not equal to zero.

For intra residue coding, due to different residual statistics of different intra prediction modes, a mode-dependent transform candidate selection process is used. Three transform subsets are defined as shown in Table 2, and a transform subset is selected based on an intra prediction mode, as specified in Table 3.

TABLE 2

Three pre-defined transform candidate sets

| Transform Set | Transform Candidates |
|---|---|
| 0 | DST-VII, DCT-VIII |
| 1 | DST-VII, DST-I |
| 2 | DST-VII, DCT-VIII |

TABLE 3

Selected (H)orizontal and (V)ertical transform sets for each intra prediction mode

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| V | 0 | 0 | 0 | 0 | 0 | 1 | 0 | 1 | 0 | 1 | 0 | 1 | 0 | 1 | 0 | 1 | 0 |
| H | 2 | 2 | 2 | 2 | 2 | 1 | 0 | 1 | 0 | 1 | 0 | 1 | 0 | 1 | 0 | 1 | 0 |

| Intra Mode | 35 | 36 | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|---|---|
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |

| Intra Mode | 53 | 54 | 55 | 56 | 57 | 58 | 59 | 60 | 61 | 62 | 63 | 64 | 65 | 66 |
|---|---|---|---|---|---|---|---|---|---|---|---|---|---|---|
| V | 2 | 2 | 1 | 0 | 1 | 0 | 1 | 0 | 1 | 0 | 1 | 0 | 1 | 0 |
| H | 0 | 0 | 1 | 0 | 1 | 0 | 1 | 0 | 1 | 0 | 1 | 0 | 1 | 0 |

With a subset concept, a transform subset is first identified based on Table 3 using an intra prediction mode of a CU with a CU-level AMT flag that is equal to 1. After that, for each of horizontal and vertical transforms, one of two transform candidates in the identified transform subset, according to in Table 2, is selected based on explicitly-signaled flags.

For an inter prediction residual, however, only one transform set, which consists of DST-VII and DCT-VIII, is used for all inter modes and for both horizontal and vertical transforms.

In VVC, only one transform set, which includes DST-VII and DCT-VIII, is adopted, and MTS is applied up to 32-point.

In VVC, a Transform Skip (TS) mode is applied for coding both intra and inter prediction residuals. For a coding block (both luma and chroma) with less than or equal to 16 samples, a flag is signaled to indicate whether TS mode is applied for current block. When TS mode is applied, the detailed modifications for each module are listed below.

(a) Prediction: No change.
(b) Transform: Skipped. Instead, for transform skipping TUs, a simple scaling process is used. To let transform skipping coefficients have similar magnitudes as other transform coefficients, a scaling-down process is performed, and the scaling factor is same with the scaling associated with other transforms (versus standard floating point transform with norm 1) of the same size.
(c) De-quantization and scaling. No change.
(d) Entropy coding: A flag is signaled to indicate if transform is bypassed or not.
(e) Deblocking, SAO and ALF: No change.
(f) A flag in the SPS to indicate whether transform skipping is enabled or not.

In VVC, a mode-dependent non-separable secondary transform (NSST) is applied between a forward core transform and quantization (at an encoder) and between de-quantization and an inverse core transform (at a decoder). To keep low complexity, NSST is only applied to low frequency coefficients after a primary transform. If both width (W) and height (H) of a transform coefficient block is larger than or equal to 8, then an 8×8 non-separable secondary transform is applied to a top-left 8×8 region of a transform coefficients block. Otherwise, if either W or H of a transform coefficient block is equal to 4, a 4×4 non-separable secondary transform is applied, and the 4×4 non-separable transform is performed on a top-left min(8,W)×min(8,H) region of the transform coefficient block. The above transform selection rule is applied for both luma and chroma components.

Matrix multiplication implementation of a non-separable transform is described as follows using a 4×4 input block as an example. To apply the non-separable transform, the 4×4 input block X is represented as a vector X in Equations (1) and (2):

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} ; \text{and} \quad (1)$$

$$\vec{X} = [X_{00} \ X_{01} \ X_{02} \ X_{03} \ X_{10} \ X_{11} \ X_{12} \ X_{13} \ X_{20} \ X_{21} \ X_{22} \ X_{23} \ X_{30} \ X_{31} \ X_{32} \ X_{33}]^T \quad (2)$$

The non-separable transform is calculated as $\vec{F} = T \cdot \vec{X}$, where $\vec{F}$ indicates a transform coefficient vector, and T is a 16×16 transform matrix. The 16×1 coefficient vector $\vec{F}$ is subsequently re-organized as a 4×4 block using a scanning order for that block (horizontal, vertical or diagonal). Coefficients with a smaller index will be placed with a smaller scanning index in the 4×4 coefficient block. In VVC, a Hypercube-Givens Transform (HyGT) with butterfly implementation is used instead of matrix multiplication to reduce a complexity of non-separable transform.

There is a total of 35×3 non-separable secondary transforms for both 4×4 and 8×8 block sizes, where 35 is a number of transform sets specified by an intra prediction mode, denoted as set, and 3 is a number of NSST candidates for each intra prediction mode. A mapping from the intra prediction mode to the transform set is defined in Table 4. The transform set applied to luma/chroma transform coefficients is specified by corresponding luma/chroma intra prediction modes, according to Table 4. For intra prediction modes larger than 34 (diagonal prediction direction), a transform coefficient block is transposed before/after a secondary transform at an encoder/decoder.

TABLE 4

Mapping from intra prediction mode to transform set index

| | | | | | | | | intra mode | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 |
| set | 0 | 1 | 2 | 3 | 4 | 5 | 6 | 7 | 8 | 9 | 10 | 11 | 12 | 13 | 14 | 15 | 16 |
| | | | | | | | | intra mode | | | | | | | | | |
| | 17 | 18 | 19 | 20 | 21 | 22 | 23 | 24 | 25 | 26 | 27 | 28 | 29 | 30 | 31 | 32 | 33 |
| set | 17 | 18 | 19 | 20 | 21 | 22 | 23 | 24 | 25 | 26 | 27 | 28 | 29 | 30 | 31 | 32 | 33 |
| | | | | | | | | intra mode | | | | | | | | | |
| | 34 | 35 | 36 | 37 | 38 | 39 | 40 | 41 | 42 | 43 | 44 | 45 | 46 | 47 | 48 | 49 | 50 |
| set | 34 | 33 | 32 | 31 | 30 | 29 | 28 | 27 | 26 | 25 | 24 | 23 | 22 | 21 | 20 | 19 | 18 |
| | | | | | | | | intra mode | | | | | | | | | |
| | 51 | 52 | 53 | 54 | 55 | 56 | 57 | 58 | 59 | 60 | 61 | 62 | 63 | 64 | 65 | 66 | 67 (LM) |
| set | 17 | 16 | 15 | 14 | 13 | 12 | 11 | 10 | 9 | 8 | 7 | 6 | 5 | 4 | 3 | 2 | NULL |

For each transform set, a selected non-separable secondary transform candidate is further specified by an explicitly signaled CU-level NSST index. The index is signaled in a bitstream once per intra CU after transform coefficients and truncated unary binarization are used. A truncated value is 2 in case of planar or DC mode, and 3 for an angular intra prediction mode. This NSST index is signaled only when there is more than one non-zero coefficients in a CU. A default value is zero when it is not signaled. Zero value of this syntax element indicates a secondary transform is not applied to the current CU, and values 1-3 indicate which secondary transform from the set should be applied.

In VVC, NSST is not applied for a block coded with a transform skip mode. When the NSST index is signaled for a CU and not equal to zero, NSST is not used for a block of a component that is coded with the transform skip mode in the CU. When a CU with blocks of all components are coded in the transform skip mode or a number of non-zero coefficients of non-transform-skip mode CBs is less than 2, the NSST index is not signaled for the CU.

Mixing NSST and EMT may be forbidden when using QTBT—effectively enforcing NSST to only be used with DCT-2 as a primary transform.

The HyGT is used in a computation of a non-separable secondary transform. Basic elements of this orthogonal transform are Givens rotations, which are defined by orthogonal matrices G(m, n, θ), which have elements defined by:

$$G_{i,j}(m, n) = \begin{cases} \cos\theta, & i = j = m \text{ or } i = j = n, \\ \sin\theta, & i = m, j = n, \\ -\sin\theta, & i = n, j = m, \\ 1, & i = j \text{ and } i \neq m \text{ and } i \neq n, \\ 0, & \text{otherwise.} \end{cases} \quad (5)$$

These transformations can be graphically represented in FIG. 1B.

HyGT is implemented by combining sets of Givens rotations in a hypercube arrangement. FIG. 1C shows a "butterfly" shape flowchart of HyGT for 16 elements (4×4 non-separable transform). Assuming that N is a power of two, a HyGT round is defined as a sequence of log 2(N) passes, where in each pass, indexes in vectors m and n are defined by edges of a hypercube with a dimension log 2(N), sequentially in each direction.

To obtain good compression, more than one HyGT round is used. As shown in FIG. 1D, a full non-separable secondary transform is composed of R rounds HyGT, and may include an optional permutation pass, to sort transform coefficients according to their variance. In VVC, a 2-round HyGT is applied for a 4×4 secondary transform, and a 4-round HyGT is applied for a 8×8 secondary transform.

SUMMARY

According to embodiments, a method of controlling residual coding for decoding or encoding of a video sequence, is performed by at least one processor and includes determining whether to replace a transform type of Multiple Transform Selection (MTS) by using Identity transform (IDT), based on whether either one or both of a block height and a block width meet a predetermined condition. The method further includes, based on either one or both of the block height and the block width meeting the predetermined condition, replacing the transform type of Multiple Transform Selection (MTS) by using the IDT and keeping a syntax of the MTS unchanged, and the IDT is a linear transform process using an N×N transform core in which each coefficient is non-zero along a diagonal position, and N is an integer.

According to embodiments, an apparatus for controlling residual coding for decoding or encoding of a video sequence includes at least one memory configured to store computer program code, and at least one processor configured to access the at least one memory and operate according to the computer program code. The computer program code includes determining code configured to cause the at least one processor to determine whether to replace a transform type of Multiple Transform Selection (MTS) by using Identity transform (IDT), based on whether either one or both of a block height and a block width meet a predetermined condition. The computer program code further includes replacing code configured to cause the at least one processor to, based on either one or both of the block height and the block width meeting the predetermined condition, replace the transform type of MTS by using the IDT and keeping a syntax of the MTS unchanged, and the IDT is a linear transform process using an N×N transform core in which each coefficient is non-zero along a diagonal position, and N is an integer.

According to embodiments, a non-transitory computer-readable storage medium stores instructions that cause at least one processor to determine whether to replace a transform type of Multiple Transform Selection (MTS) by using Identity transform (IDT), based on whether either one or both of a block height and a block width meet a predetermined condition. The instructions further cause the at least one processor to based on either one or both of the block height and the block width meeting the predetermined condition, replace the transform type of MTS by using the IDT and keeping a syntax of the MTS unchanged, and the IDT is a linear transform process using an N×N transform core in which each coefficient is non-zero along a diagonal position, and N is an integer.

DETAILED DESCRIPTION

Figure 1A:
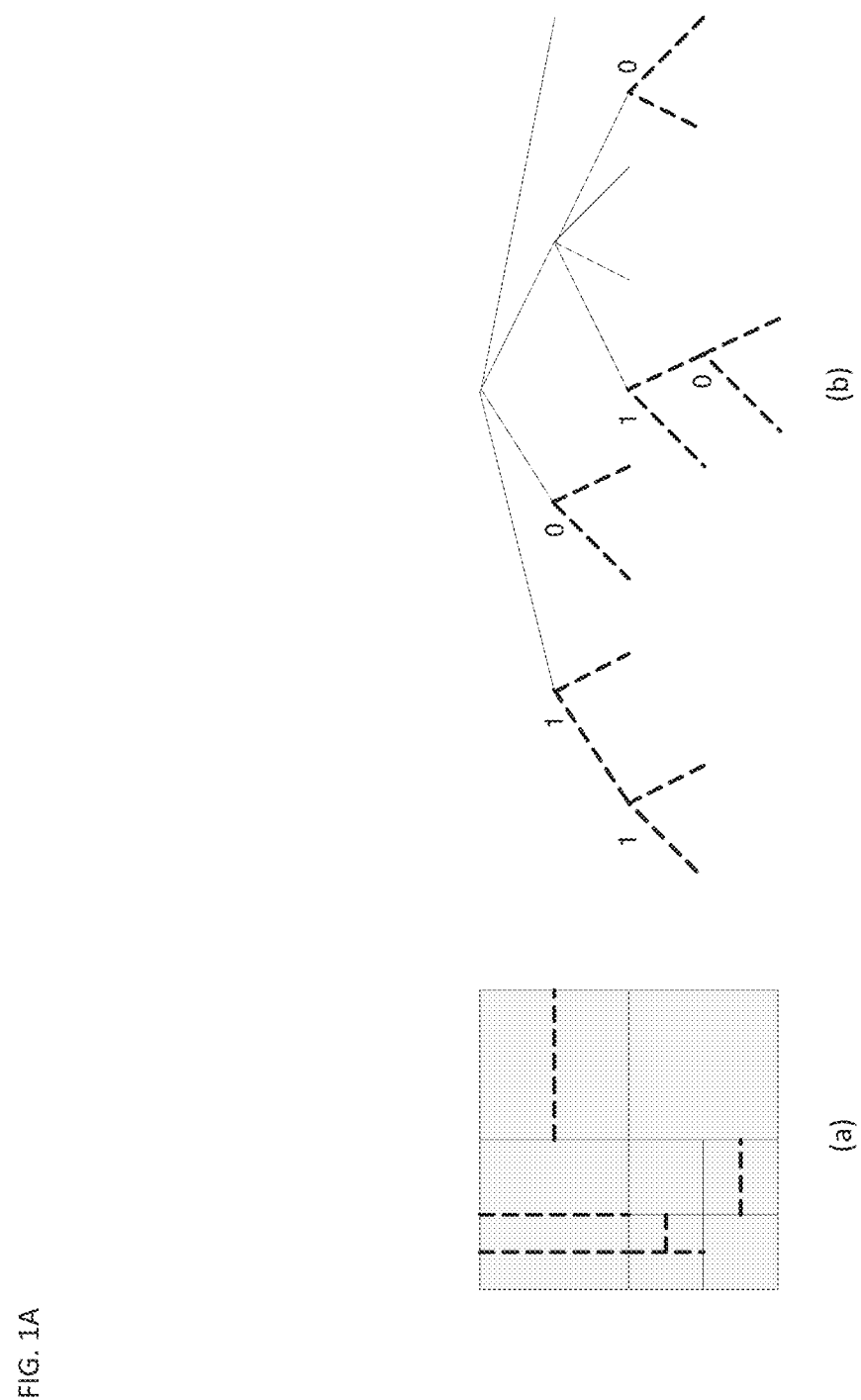
FIG. 1A is a diagram illustrating a QTBT structure.
Figure 1B:
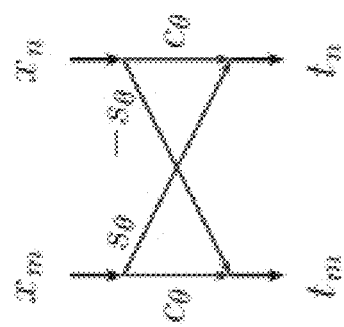
FIG. 1B is a diagram illustrating a graphical representation of Givens rotations.
Figure 1C:
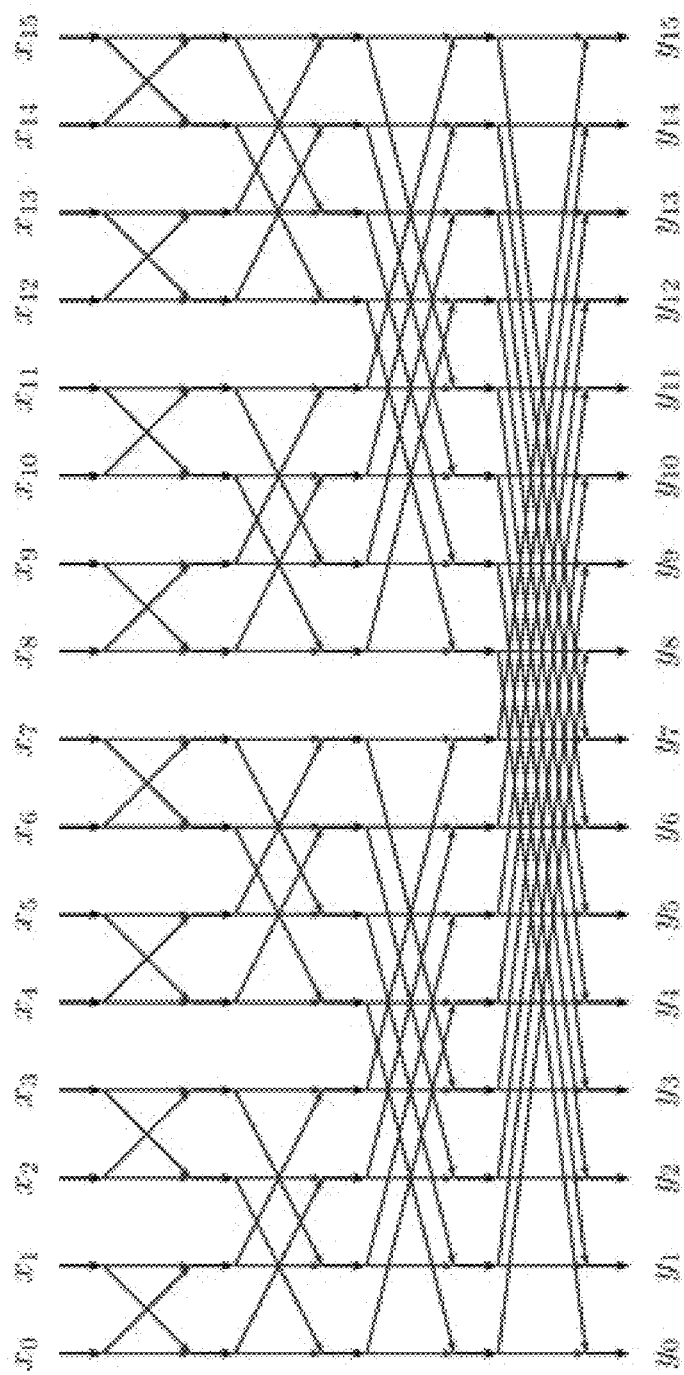
FIG. 1C is a diagram illustrating an HyGT that is defined by combinations of Givens rotations in a hypercube arrangement.
Figure 1D:
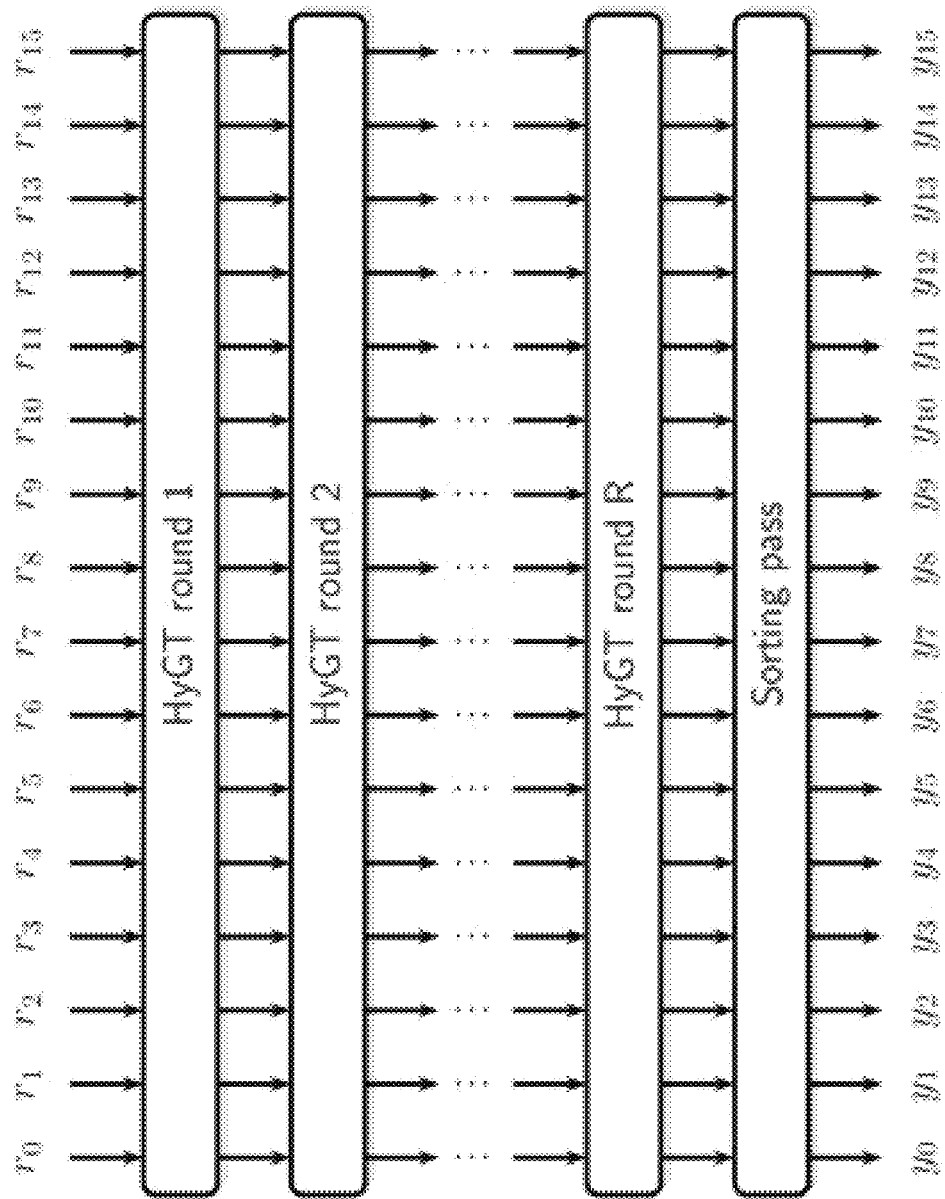
FIG. 1D is another diagram illustrating an HyGT that is defined by combination of Givens rotations in a hypercube arrangement.
Figure 2:
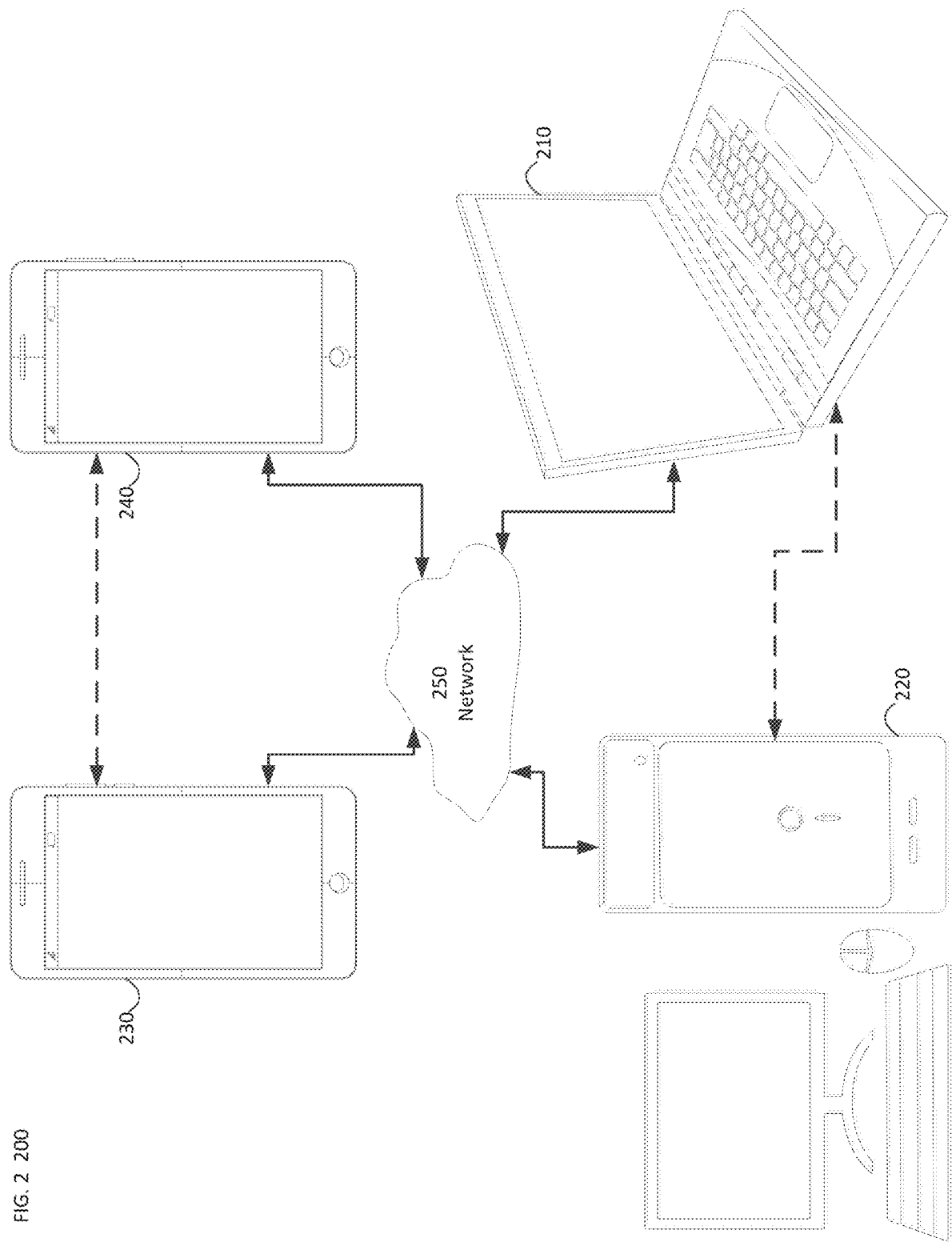
FIG. 2 is a simplified block diagram of a communication system according to an embodiment.

FIG. 2 is a simplified block diagram of a communication system (200) according to an embodiment. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of embodiments are not so limited. Embodiments find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of embodiments unless explained herein below.

Figure 3:
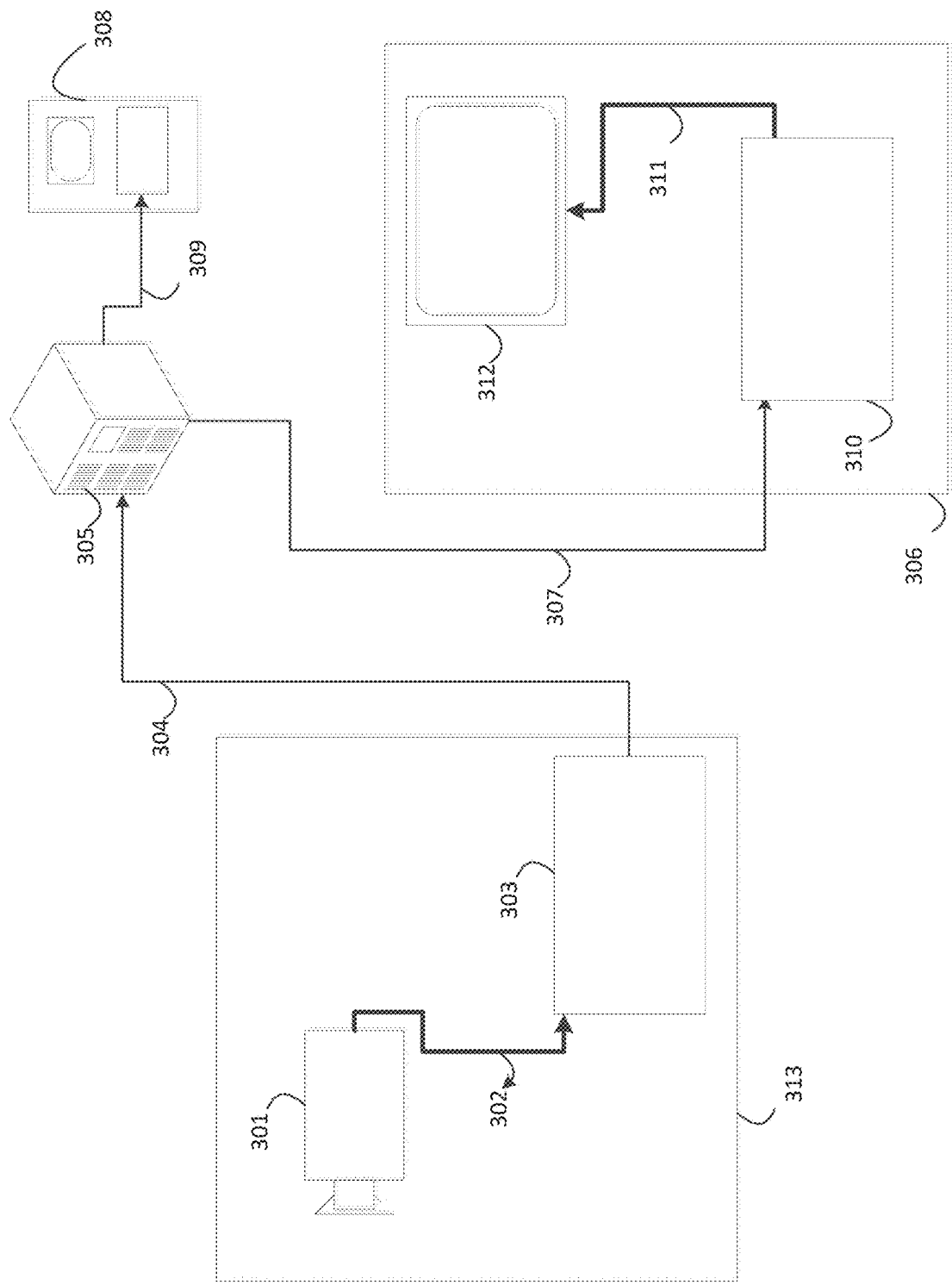
FIG. 3 is a diagram of a placement of a video encoder and a video decoder in a streaming environment, according to an embodiment.

FIG. 3 is a diagram of a placement of a video encoder and a video decoder in a streaming environment, according to an embodiment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313) that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera (301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as VVC. The disclosed subject matter may be used in the context of VVC.

Figure 4:
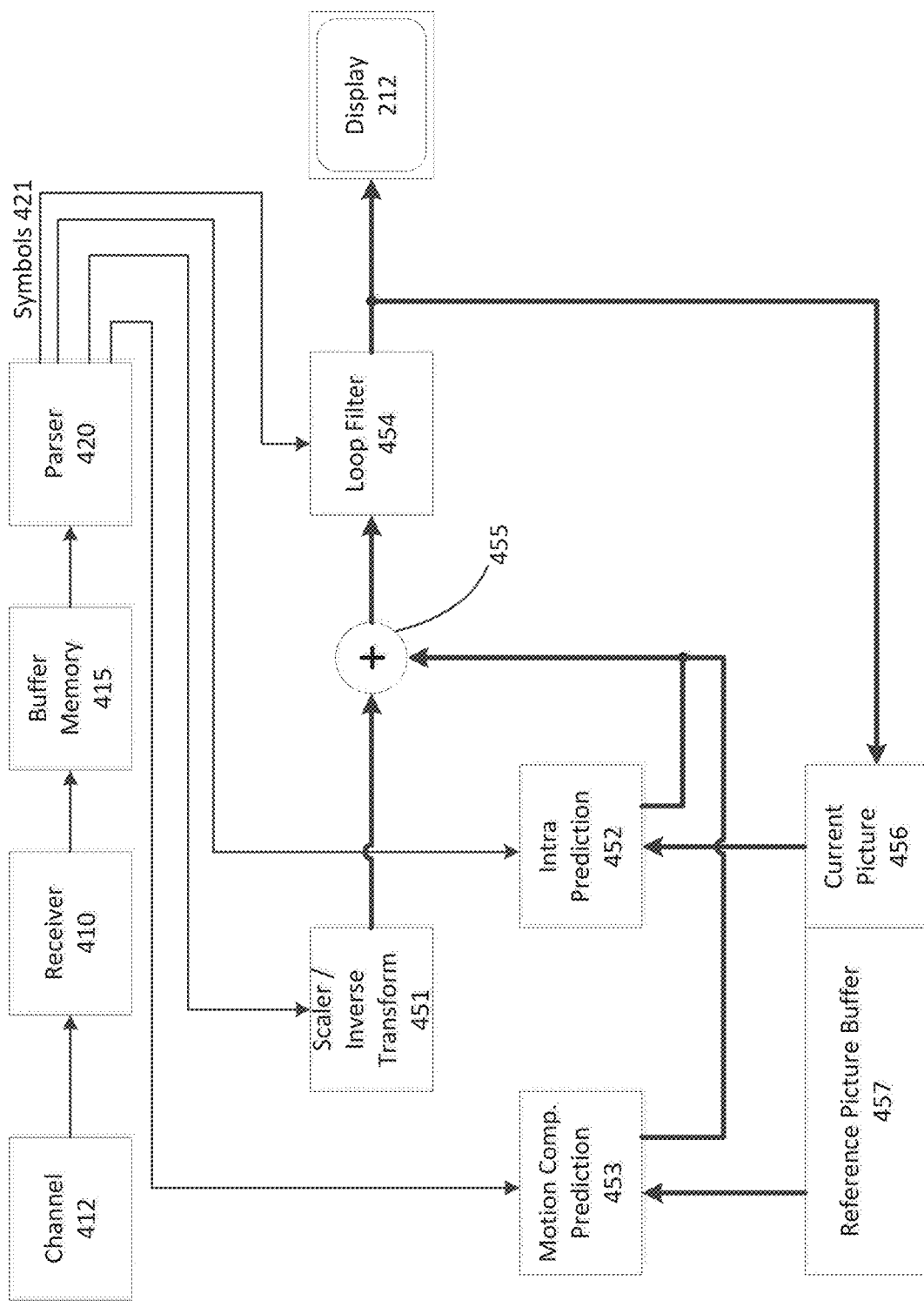
FIG. 4 is a functional block diagram of a video decoder according to an embodiment.

FIG. 4 is a functional block diagram of a video decoder (310) according to an embodiment.

A receiver (410) may receive one or more codec video sequences to be decoded by the decoder (310); in the same or an embodiment, one coded video sequence at a time, where the decoding of each coded video sequence is independent from other coded video sequences. The coded video sequence may be received from a channel (412), which may be a hardware/software link to a storage device which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include a parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (420) may perform entropy decoding/parsing operation on the video sequence received from the buffer (415), so to create symbols (421). The parser (420) may receive encoded data, and selectively decode particular symbols (421). Further, the parser (420) may determine whether the particular symbols (421) are to be provided to a Motion Compensation Prediction unit (453), a scaler/inverse transform unit (451), an Intra Prediction unit (452), or a loop filter unit (454).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (421) from the parser (420). It can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (456). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (454). Video compression technologies can include in-loop filter technologies that are controlled by parameters included in the coded video bitstream and made available to the loop filter unit (454) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (454) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (456) can become part of the reference picture buffer (457), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (410) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 5:
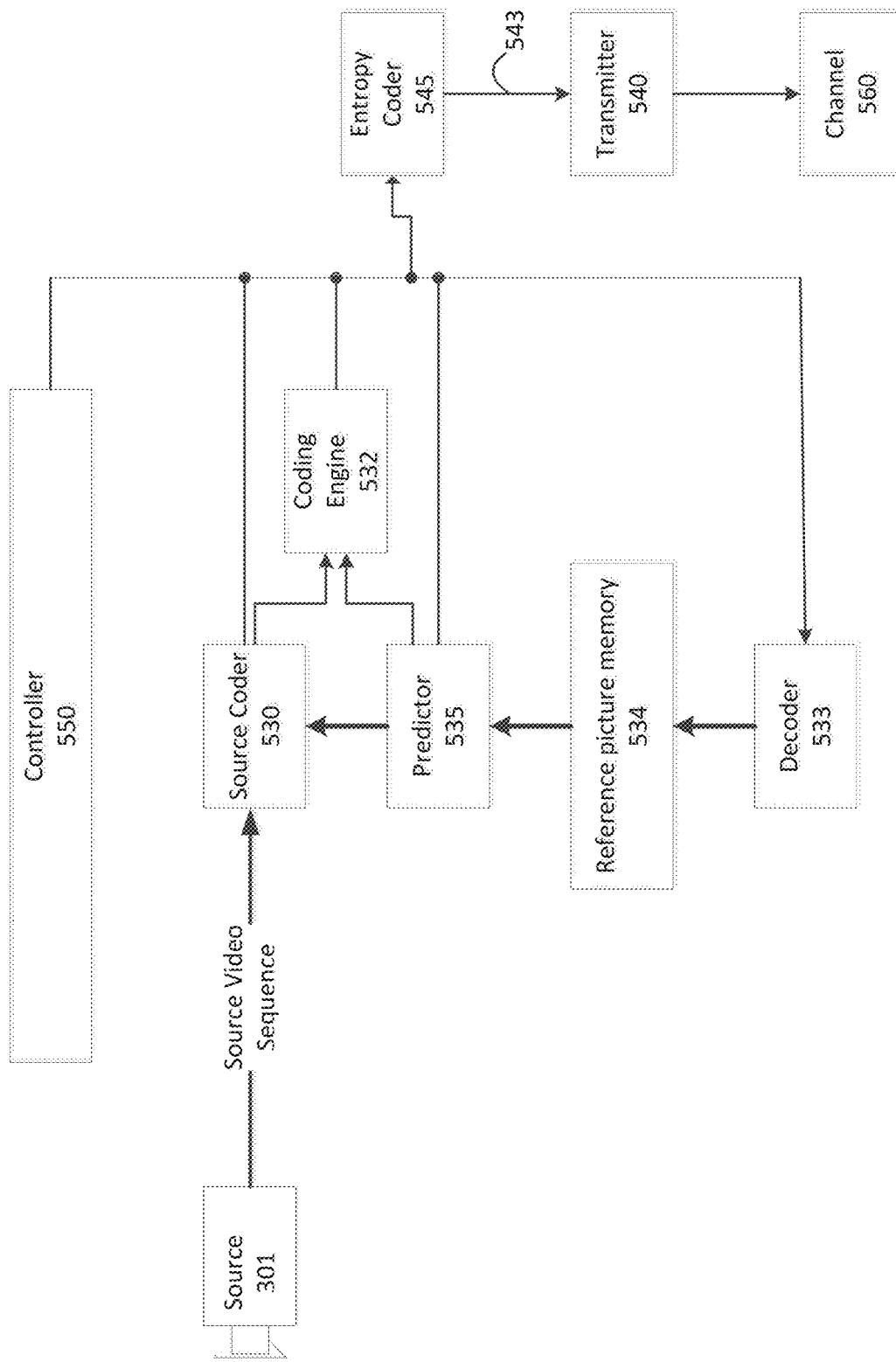
FIG. 5 is a functional block diagram of a video encoder according to an embodiment.

FIG. 5 is a functional block diagram of a video encoder (303) according to an embodiment.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the art readily recognizes as a "coding loop." As an oversimplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 4, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 4), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device that may store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

In VVC, there are separate syntaxes and semantics for TS mode and MTS, however, these two tools are both related to transform selection, and the syntaxes and semantics can be harmonized.

Separate signaling of TS mode and MTS increases the complexity for both the encoder and the decoder. For the encoder, an additional TS mode should be checked if MTS is not used. For the decoder, TS mode is implemented separately from MTS.

In TS mode, both horizontal and vertical transforms are skipped. However, it is more flexible to have transform skipped for either horizontal or vertical, or both horizontal and vertical.

TS mode is applied for blocks with area size smaller than or equal to 16, for 4×2 and 2×4 blocks, since the area size is not a power of 2, to re-use the same quantization scheme, multiplication operations are needed in TS mode, which are additional computation cost comparing to 4-point transform skip which does not involve multiplications.

Thus, according to embodiments, certain transform types of MTS are replaced by Identity transform (IDT), but keeping the syntax of MTS unchanged. An N-point IDT is a linear transform process using an N×N transform core which has only non-zero coefficient along the diagonal positions, the diagonal positions refer to positions having equal horizontal and vertical coordinate values.

According to an embodiment, certain transform types of MTS, (namely trType) are replaced by IDT (or certain transform types of MTS are replaced by IDT if the certain transform types of MTS are applied on the smaller side of block) if the block width and/or height meets pre-defined conditions.

The following conditions may be used separately or combined in any order.

(a) In an example, the certain transform types of MTS include, but not limited to DCT-1, DCT-2, . . . DCT-8, DST-1, DST-2, . . . DST-8. This bullet applies to below a.ii~a.ix.

(b) In an example, the certain transform types of MTS can be DCT-8 or DCT-4.

(c) In an example, it is further restricted that when selecting the primary transform type, intra prediction mode information is not used. That is, there is no intra prediction mode dependency on selecting the primary transform type.

(d) In an example, the condition is whether the said certain transform types of MTS are applied as the horizontal transform and block width is smaller than or equal to a pre-defined threshold. Example values (T) include but not limited to 2, 4, 8, 16, 32, 64, 128, 256.

(e) In another example, the condition is whether the said certain transform types of MTS are applied as the vertical transform and block height is smaller than or equal to a pre-defined threshold. Example values (T) include but are not limited to 2, 4, 8, 16, 32, 64, 128, 256.

(f) In an example, the condition is whether the block area size is smaller than or equal to a pre-defined value, example values (T) include but are not limited to 8, 16, 32, 64, 128, 256, 512, 1024.

(f) In another example, the condition is whether max(width/height, height/width) ratio is smaller than or larger than a pre-defined threshold value. Example values of the threshold values (T) include, but not limited to 2, 4, 8, 16, 32.

(g) In another example, the condition is whether min(height, width) is smaller than a pre-defined threshold.

(h) In an embodiment, the threshold values (T) mentioned above, or Log 2(T) or Log 2(T)−1, or Log 2(T−2) can be signaled in Slice header, PPS, SPS, VPS.

(i) In another example, transform type trType is replaced by IDT if horizontal and transform types are different. That is, if transform type trType is used only on horizontal direction or vertical direction, but not both, then transform type trType is replaced by IDT.

(j) In an example, the horizontal and vertical transform combinations used in MTS, i.e., {DST-7, DST-7}, {DST-7, DCT-8}, {DCT-8, DST-7}, {DCT-8, DCT-8}, are replaced by a different set of horizontal and vertical transform combinations, including: {DST-7, DST-7}, {DST-7, IDT}, {IDT, DST-7} and {DCT-8, DCT-8}.

In an embodiment, the transform core of IDT has only non-zero elements $2^M*\text{sqrt}(N)$, where M is integers, example values of M include, but not limited to −20, −19, ..., 0, 1, 2, ... 19, 20.

In an embodiment, the transform core of IDT has only non-zero elements $\text{Floor}(2^M*\text{sqrt}(N)+0.5)$, where M is integers, example values of M include, but are not limited to −20, −19, ..., 0, 1, 2, ... 19, 20, Floor(.) is the floor function which returns the largest integer which is smaller than the input value.

In another embodiment, the transform core of IDT has only non-zero elements values being $2^M$, where values of M depend on transform size.

According to an embodiment a different quantization matrix is applied for different primary and/or secondary transform types.

Depending on whether IDT is applied on horizontal direction, vertical direction or both horizontal and vertical direction, different quantization matrices are used.

In an example, if IDT is applied as both horizontal and vertical transform, a flat quantization matrix (with identical elements) is used.

In an example, if IDT is only applied as the horizontal transform, then a quantization matrix with identical elements along the horizontal direction is used.

In another example, if IDT is only applied as the vertical transform, then a quantization matrix with identical elements along the vertical direction is used.

Depending on which MTS candidates are applied on horizontal direction, vertical direction or both horizontal and vertical direction, different quantization matrices are used.

According to an embodiment, when signaling the MTS transform index, if the number of non-zero coefficients is less than or equal to a pre-defined threshold value, then MTS transform index is not signaled but implicitly derived as 0. The threshold value may depend on the primary and/or secondary transform types.

The following conditions may be used separately or combined in any order.

(a) In an example, if IDT is applied as both horizontal and vertical transform, the threshold value is −1 or 0 or 1.

(b) In another example, if IDT is applied as either horizontal and vertical transform, but not both horizontal and vertical transform, the threshold value is −1 or 0 or 1, and the value is different from the threshold value used in MTS transform index signaling when IDT is not applied.

(c) According to an embodiment, it is determined whether and which NSST transform cores are used depending on whether IDT is applied as the horizontal transform, vertical transform or both horizontal and vertical transforms.

The following conditions may be used separately or combined in any order.

(a) In an example, if IDT is applied as both horizontal and vertical transform, NSST is not applied.

(b) In an example, if IDT is applied as either horizontal and vertical transform, NSST is not applied.

(c) In an embodiment, whether NSST is applied may not only depend on the usage of IDT in MTS, but also depend on other coded information or any information that is available to both encoder and decoder, including, but not limited to block width, block height, block area size, block width to height ratio, intra prediction mode.

The below syntax descriptions illustrate changes to the VVC spec text draft version 2, according to an embodiment. Text that is added is shown and text that is deleted is shown in italics.

| Picture parameter set RBSP syntax | |
|---|---|
| pic_parameter_set_rbsp( ) { | Descriptor |
|   pps_pic_parameter_set_id | ue(v) |
|   pps_seq_parameter_set_id | ue(v) |
|   *transform_skip_enabled_flag* | *u(1)* |
|   rbsp_trailing_bits( ) | |
| } | |

| Residual coding syntax | |
|---|---|
| residual_coding( x0, y0, log2TbWidth, log2TbHeight, cIdx ) { | Descriptor |
|   if( transform_skip_enabled_flag && ( cIdx != 0 \|\| *cu_mts_flag*[ x0 ][ y0 ] == 0 ) && ( log2TbWidth <= 2 ) && ( log2TbHeight <= 2 ) ) | |
|     transform_skip_flag[ x0 ][ y0 ][ cIdx ] | ae(v) |
|   last_sig_coeff_x_prefix | ae(v) |

-continued

| Residual coding syntax | |
|---|---|
| residual_coding( x0, y0, log2TbWidth, log2TbHeight, cIdx ) { | Descriptor |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2SbSize = ( Min( log2TbWidth, log2TbHeight ) < 2 ? 1 : 2 ) | |
|   numSbCoeff = 1 << ( log2SbSize << 1 ) | |
|   lastScanPos = numSbCoeff | |
|   lastSubBlock = ( 1 << ( log2TbWidth + log2TbHeight − 2 * log2SbSize ) ) − 1 | |
|   do { | |
|     if( lastScanPos = = 0 ) { | |
|       lastScanPos = numSbCoeff | |
|       lastSubBlock− − | |
|     } | |
|     lastScanPos− − | |
|     xS = DiagScanOrder[ log2TbWidth − log2SbSize ][ log2TbHeight − log2SbSize ] | |
|         [ lastSubBlock ][ 0 ] | |
|     yS = DiagScanOrder[ log2TbWidth − log2SbSize ][ log2TbHeight − log2SbSize ] | |
|         [ lastSubBlock ][ 1 ] | |
|     xC = ( xS << log2SbSize ) + | |
|       DiagScanOrder[ log2SbSize ][ log2SbSize ][ lastScanPos ][ 0 ] | |
|     yC = ( yS << log2SbSize ) + | |
|       DiagScanOrder[ log2SbSize ][ log2SbSize ][ lastScanPos ][ 1 ] | |
|   } while( ( xC != LastSignificantCoeffX ) \|\| ( yC != LastSignificantCoeffY ) ) | |
|   QState = 0 | |
|   for( i = lastSubBlock; i >= 0; i− −) { | |
|     startQStateSb = QState | |
|     xS = DiagScanOrder[ log2TbWidth − log2SbSize ][ log2TbHeight − log2SbSize ] | |
|         [ lastSubBlock ][ 0 ] | |
|     yS = DiagScanOrder[ log2TbWidth − log2SbSize ][ log2TbHeight − log2SbSize ] | |
|         [ lastSubBlock ][ 1 ] | |
|     inferSbDcSigCoeffFlag = 0 | |
|     if( ( i < lastSubBlock ) && ( i > 0 ) ) { | |
|       coded_sub_block_flag[ xS ][ yS ] | ae(v) |
|       inferSbDcSigCoeffFlag = 1 | |
|     } | |
|     firstSigScanPosSb = numSbCoeff | |
|     lastSigScanPosSb = −1 | |
|     for( n = ( i = = lastSubBlock ) ? lastScanPos − 1 : numSbCoeff − 1; n >= 0; n− −) { | |
|       xC = ( xS << log2SbSize ) + DiagScanOrder[ log2SbSize ][ log2SbSize ][ n ][ 0 ] | |
|       yC = ( yS << log2SbSize ) + DiagScanOrder[ log2SbSize ][ log2SbSize ][ n ][ 1 ] | |
|       if( coded_sub_block_flag[ xS ][ yS ] && ( n > 0 \|\| !inferSbDcSigCoeffFlag ) ) { | |
|         sig_coeff_flag[ xC ][ yC ] | ae(v) |
|       } | |
|       if( sig_coeff_flag[ xC ][ yC ] ) { | |
|         par_level_flag[ n ] | ae(v) |
|         rem_abs_gt1_flag[ n ] | ae(v) |
|         if( lastSigScanPosSb = = −1 ) | |
|           lastSigScanPosSb = n | |
|         firstSigScanPosSb = n | |
|       } | |
|       AbsLevelPass1[ xC ][ yC ] = | |
|         sig_coeff_flag[ xC ][ yC ] + par_level_flag[ n ] + 2 * rem_abs_gt1_flag[ n ] | |
|       if( dep_quant_enabled_flag ) | |
|         QState = QStateTransTable[ QState ][ par_level_flag[ n ] ] | |

| Residual coding syntax |  |
| --- | --- |
| residual_coding( x0, y0, log2TbWidth, log2TbHeight, cIdx ) { | Descriptor |

```
    }
    for( n = numSbCoeff − 1; n >= 0; n− − ) {
      if( rem_abs_gt1_flag[ n ] )
        rem_abs_gt2_flag[ n ]                                                         ae(v)
    }
    for( n = numSbCoeff − 1; n >= 0; n− −) {
      xC = ( xS << log2SbSize ) + DiagScanOrder[ log2SbSize ][ log2SbSize ][ n ][ 0 ]
      yC = ( yS << log2SbSize ) + DiagScanOrder[ log2SbSize ][ log2SbSize ][ n ][ 1 ]
      if( rem_abs_gt2_flag[ n ] )
        abs_remainder[ n ]
      AbsLevel[ xC ][ yC ] = AbsLevelPass1[ xC ][ yC ] +
                2 * ( rem_abs_gt2_flag[ n ] + abs_remainder[ n ] )
    }
    if( dep_quant_enabled_flag | | !sign_data_hiding_enabled_flag )
      signHidden = 0
    else
      signHidden = ( lastSigScanPosSb − firstSigScanPosSb > 3 ? 1 : 0 )
    for( n = numSbCoeff − 1; n >= 0; n− −) {
      xC = ( xS << log2SbSize ) + DiagScanOrder[ log2SbSize ][ log2SbSize ][ n ][ 0 ]
      yC = ( yS << log2SbSize ) + DiagScanOrder[ log2SbSize ][ log2SbSize ][ n ][ 1 ]
      if( sig_coeff_flag[ xC ][ yC ] &&
        ( !signHidden | | ( n != firstSigScanPosSb ) ) )
        coeff_sign_flag[ n ]                                                          ae(v)
    }
    if( dep_quant_enabled_flag ) {
      QState = startQStateSb
      for( n = numSbCoeff − 1; n >= 0; n− −) {
        xC = ( xS << log2SbSize ) +
             DiagScanOrder[ log2SbSize ][ log2SbSize ][ n ][ 0 ]
        yC = ( yS << log2SbSize ) +
             DiagScanOrder[ log2SbSize ][ log2SbSize ][ n ][ 1 ]
        if( sig_coeff_flag[ xC ][ yC ] )
          TransCoeffLevel[ x0 ][ y0 ][ cIdx ][ xC ][ yC ] =
             ( 2 * AbsLevel[ xC ][ yC ] − ( QState > 1 ? 1: 0 ) ) *
             ( 1 − 2 * coeff_sign_flag[ n ] )
        QState = QStateTransTable[ QState ][ par_level_flag[ n ] ]
    } else {
      sumAbsLevel = 0
      for( n = numSbCoeff − 1; n >= 0; n− −) {
        xC = ( xS << log2SbSize ) +
             DiagScanOrder[ log2SbSize ][ log2SbSize ][ n ][ 0 ]
        yC = ( yS << log2SbSize ) +
             DiagScanOrder[ log2SbSize ][ log2SbSize ][ n ][ 1 ]
        if( sig_coeff_flag[ xC ][ yC ] ) {
          TransCoeffLevel[ x0 ][ y0 ][ cIdx ][ xC ][ yC ] =
             AbsLevel[ xC ][ yC ] * ( 1 − 2 * coeff_sign_flag[ n ] )
          if( signHidden ) {
            sumAbsLevel += AbsLevel[ xC ][ yC ]
            if( ( n = = firstSigScanPosSb ) && ( sumAbsLevel % 2 ) = = 1 ) )
              TransCoeffLevel[ x0 ][ y0 ][ cIdx ][ xC ][ yC ] =
                −TransCoeffLevel[ x0 ][ y0 ][ cIdx ][ xC ][ yC ]
          }
        }
      }
    }
  }
  if( cu_mts_flag[ x0 ][ y0 ] && ( cIdx = = 0 ) &&
    !transform_skip_flag[ x0 ][ y0 ][ cIdx ] &&
    ( ( CuPredMode[ x0 ][ y0 ] = = MODE_INTRA && numSigCoeff > 2 ) | |
      ( CuPredMode[ x0 ][ y0 ] = = MODE_INTER ) ) ) {
    mts_idx[ x0 ][ y0 ]                                                               ae(v)
}
```

Picture Parameter Set RBSP Semantics pps_pic_parameter_set_id identifies the PPS for reference by other syntax elements. The value of pps_pic_parameter_set_id shall be in the range of 0 to 63, inclusive.

pps_seq_parameter_set_id specifies the value of sps_seq_parameter_set_id for the active SPS. The value of pps_seq_parameter_set_id shall be in the range of 0 to 15, inclusive.

transform_skip_enabled_flag equal to 1 specifies that transform_skip_flag may be present in the residual coding syntax. transform_skip_enabled_flag equal to 0 specifies that transform_skip_flag is not present in the residual coding syntax.

Residual Coding Semantics

The array AbsLevel[xC][yC] represents an array of absolute values of transform coefficient levels for the current transform block and the array AbsLevelPass1[xC][yC] represents an array of partially reconstructed absolute values of transform coefficient levels for the current transform block. The array indices xC and yC specify the transform coefficient location (xC, yC) within the current transform block. When the value of AbsLevel[xC][yC] is not specified in clause 7.3.4.8, it is inferred to be equal to 0. When the value of AbsLevelPass1[xC][yC] is not specified in clause 7.3.4.8, it is inferred to be equal to 0.

The variables CoeffMin and CoeffMax specifying the minimum and maximum transform coefficient values are derived by the following Equations (3) and (4):

$$\text{CoeffMin} = -(1 << 15) \tag{3}$$

$$\text{CoeffMax} = (1 << 15) - 1 \tag{4}$$

The array QStateTransTable[ ][ ] is specified by the following Equation:

$$\text{QStateTransTable}[\ ][\ ] = \{\{0,2\},\{2,0\},\{1,3\},\{3,1\}\} \tag{5}$$

transform_skip_flag[x0][y0][cIdx] specifies whether a transform is applied to the associated transform block or not: The array indices x0, y0 specify the location (x0, y0) of the top-left luma sample of the considered transform block relative to the top-left luma sample of the picture. The array index cIdx specifies an indicator for the colour component; it is equal to 0 for luma, equal to 1 for Cb and equal to 2 for Cr. transform_skip_flag[x0][y0][cIdx] equal to 1 specifies that no transform is applied to the current transform block. transform_skip_flag[x0][y0][cIdx] equal to 0 specifies that the decision whether transform is applied to the current transform block or not depends on other syntax elements. When transform_skip_flag[x0][y0][cIdx] is not present, it is inferred to be equal to 0.

last_sig_coeff_x_prefix specifies the prefix of the column position of the last significant coefficient in scanning order within a transform block. The values of last_sig_coeff_x_prefix shall be in the range of 0 to (log 2TbWidth<<1)−1, inclusive.

last_sig_coeff_y_prefix specifies the prefix of the row position of the last significant coefficient in scanning order within a transform block. The values of last_sig_coeff_y_prefix shall be in the range of 0 to (log 2TbHeight<<1)−1, inclusive.

last_sig_coeff_x_suffix specifies the suffix of the column position of the last significant coefficient in scanning order within a transform block. The values of last_sig_coeff_x_suffix shall be in the range of 0 to (1<<((last_sig_coeff_x_prefix>>1)−1))−1, inclusive.

The column position of the last significant coefficient in scanning order within a transform block LastSignificantCoeffX is derived as follows:

Scaling and Transformation Process

Inputs to this process are:
  a luma location (xTbY, yTbY) specifying the top-left sample of the current luma transform block relative to the top-left luma sample of the current picture,
  a variable cIdx specifying the colour component of the current block,
  a variable nTbW specifying the transform block width,
  a variable nTbH specifying the transform block height.

Output of this process is the (nTbW)×(nTbH) array of residual samples resSamples[x][y] with x=0 . . . nTbW−1, y=0 . . . nTbH−1.

The variables bitDepth, bdShift and tsShift are derived by the following equations:

$$\text{bitDepth} = (cIdx == 0)?\text{BitDepth}_Y:\text{BitDepth}_C \tag{6}$$

$$bd\text{Shift} = \text{Max}(22 - \text{bitDepth}, 0) \tag{7}$$

$$ts\text{Shift} = 5 + ((\text{Log } 2(nTbW) + \text{Log } 2(nTbH))/2) \tag{8}$$

The (nTbW)×(nTbH) array of residual samples resSamples is derived as follows:

(1) The scaling process for transform coefficients as specified in clause 8.3.3 is invoked with the transform block location (xTbY, yTbY), the transform width nTbW and the transform height nTbH, the colour component variable cIdx and the bit depth of the current colour component bitDepth as inputs, and the output is an (nTbW)×(nTbH) array of scaled transform coefficients d.

(2) The (nTbW)×(nTbH) array of residual samples r is derived as follows:
  If transform_skip_flag[xTbY][yTbY][cIdx] is equal to 1, the residual sample array values r[x][y] with with x=0 . . . nTbW−1, y=0 . . . nTbH−1 are derived as follows:

$$r[x][y] = d[x][y] << ts\text{Shift} \tag{9}$$

Otherwise (transform_skip_flag[xTbY][yTbr][cIdx] is equal to 0), the transformation process for scaled transform coefficients as specified in clause 8.3.4.1 is invoked with the transform block location (xTbY, yTbY), the transform width nTbW and the transform height nTbH, the colour component variable cIdx and the (nTbW)×(nTbH) array of scaled transform coefficients d as inputs, and the output is an (nTbW)×(nTbH) array of residual samples r.

(3) The residual samples resSamples[x][y] with x=0 . . . nTbW−1, y=0 . . . nTbH−1 are derived by the following Equation:

$$\text{resSamples}[x][y] = (r[x][y] + (1 << (bd\text{Shift} - 1))) >> bd\text{Shift} \tag{10}$$

Transformation Matrix Derivation Process

Inputs to this process are:
  a variable nTbS specifying the horizontal sample size of scaled transform coefficients,
  the transformation kernel type trType.

Output of this process is the transformation matrix transMatrix.

The transformation matrix transMatrix is derived based on trType and nTbs as follows:
  If trType is equal to 0, the following Equations apply:

$$\text{transMatrix}[m][n] = \text{transMatrixCol0to15}[m][n] \text{ with } m=0 \ldots 15, n=0 \ldots 63 \tag{11}$$

$transMatrixCol0to15 =$ (12)

$$\begin{Bmatrix}
\{ & 256 & 256 & 256 & 256 & 256 & 256 & 256 & 256 & 256 & 256 & 256 & 256 & 256 & 256 & 256 & 256 & \} \\
\{ & 362 & 361 & 359 & 357 & 353 & 349 & 344 & 338 & 331 & 323 & 315 & 306 & 296 & 285 & 274 & 262 & \} \\
\{ & 362 & 358 & 351 & 341 & 327 & 311 & 291 & 268 & 243 & 216 & 186 & 155 & 122 & 88 & 53 & 18 & \} \\
\{ & 361 & 353 & 338 & 315 & 285 & 250 & 208 & 163 & 114 & 62 & 9 & -44 & -97 & -147 & -194 & -236 & \} \\
\{ & 360 & 346 & 319 & 280 & 230 & 171 & 105 & 35 & -35 & -105 & -171 & -230 & -280 & -319 & -346 & -360 & \} \\
\{ & 359 & 338 & 296 & 236 & 163 & 79 & -9 & -97 & -178 & -250 & -306 & -344 & -361 & -357 & -331 & -285 & \} \\
\{ & 358 & 327 & 268 & 186 & 88 & -18 & -122 & -216 & -291 & -341 & -362 & -351 & -311 & -243 & -155 & -53 & \} \\
\{ & 357 & 315 & 236 & 130 & 9 & -114 & -223 & -306 & -353 & -359 & -323 & -250 & -147 & -27 & 97 & -208 & \} \\
\{ & 355 & 301 & 201 & 71 & -71 & -201 & -301 & -355 & -355 & -301 & -201 & -71 & 71 & 201 & 301 & 355 & \} \\
\{ & 353 & 285 & 163 & 9 & -147 & -274 & -349 & -357 & -296 & -178 & -27 & 130 & 262 & 344 & 359 & 306 & \} \\
\{ & 351 & 268 & 122 & -53 & -216 & -327 & -362 & -311 & -186 & -18 & 155 & 291 & 358 & 341 & 243 & 88 & \} \\
\{ & 349 & 250 & 79 & -114 & -274 & -357 & -338 & -223 & -44 & 147 & 296 & 361 & 323 & 194 & 9 & -178 & \} \\
\{ & 346 & 230 & 35 & -171 & -319 & -360 & -280 & -105 & 105 & 280 & 360 & 319 & 171 & -35 & -230 & -346 & \} \\
\{ & 344 & 208 & -9 & -223 & -349 & -338 & -194 & 27 & 236 & 353 & 331 & 178 & -44 & -250 & -357 & -323 & \} \\
\{ & 341 & 186 & -53 & -268 & -362 & -291 & -88 & 155 & 327 & 351 & 216 & -18 & -243 & -358 & -311 & -122 & \} \\
\{ & 338 & 163 & -97 & -306 & -357 & -223 & 27 & 262 & 362 & 274 & 44 & -208 & -353 & -315 & -144 & 147 & \} \\
\{ & 334 & 139 & -139 & -334 & -334 & -139 & 139 & 334 & 334 & 139 & -139 & -334 & -334 & -139 & 139 & 334 & \} \\
\{ & 331 & 114 & -178 & -353 & -296 & -44 & 236 & 362 & 250 & -27 & -285 & -357 & -194 & 97 & 323 & 338 & \} \\
\{ & 327 & 88 & -216 & -362 & -243 & 53 & 311 & 341 & 122 & -186 & -358 & -268 & 18 & 291 & 351 & 155 & \} \\
\{ & 323 & 62 & -250 & -359 & -178 & 147 & 353 & 274 & -27 & -306 & -338 & -97 & 223 & 362 & 208 & -114 & \} \\
\{ & 319 & 35 & -280 & -346 & -105 & 230 & 360 & 171 & -171 & -360 & -230 & 105 & 346 & 280 & -35 & -319 & \} \\
\{ & 315 & 9 & -306 & -323 & -27 & 296 & 331 & 44 & -285 & -338 & -62 & 274 & 344 & 79 & -262 & -349 & \} \\
\{ & 311 & -18 & -327 & -291 & 53 & 341 & 268 & -88 & -351 & -243 & 122 & 358 & 216 & -155 & -362 & -186 & \} \\
\{ & 306 & -44 & -344 & -250 & 130 & 361 & 178 & -208 & -357 & -97 & 274 & 331 & 9 & -323 & -285 & 79 & \} \\
\{ & 301 & -71 & -355 & -201 & 201 & 355 & 71 & -301 & -301 & 71 & 355 & 201 & -201 & -355 & -71 & 301 & \} \\
\{ & 296 & -97 & -361 & -147 & 262 & 323 & -44 & -353 & -194 & 223 & 344 & 9 & -338 & -236 & 178 & 357 & \} \\
\{ & 291 & -122 & -362 & -88 & 311 & 268 & -155 & -358 & -53 & 327 & 243 & -186 & -351 & -18 & 341 & 216 & \} \\
\{ & 285 & -147 & -357 & -27 & 344 & 194 & -250 & -315 & 97 & 362 & 79 & -323 & -236 & 208 & 338 & -44 & \} \\
\{ & 280 & -171 & -346 & 35 & 360 & 105 & -319 & -230 & 230 & 319 & -105 & -360 & -35 & 346 & 171 & -280 & \} \\
\{ & 274 & -194 & -331 & 97 & 359 & 9 & -357 & -114 & 323 & 208 & -262 & -285 & 178 & 338 & -79 & -361 & \} \\
\{ & 268 & -216 & -311 & 155 & 341 & -88 & -358 & 18 & 362 & 53 & -351 & -122 & 327 & 186 & -291 & -243 & \} \\
\{ & 262 & -236 & -285 & 208 & 306 & -178 & -323 & 147 & 338 & -114 & -349 & 79 & 357 & -44 & -361 & 9 & \} \\
\{ & 256 & -256 & -256 & 256 & 256 & -256 & -256 & 256 & 256 & -256 & -256 & 256 & 256 & -256 & -256 & 256 & \} \\
\{ & 250 & -274 & -223 & 296 & 194 & -315 & -163 & 331 & 130 & -344 & -97 & 353 & 62 & -359 & -27 & 362 & \} \\
\{ & 243 & -291 & -186 & 327 & 122 & -351 & -53 & 362 & -18 & -358 & 88 & 341 & -155 & -311 & 216 & 268 & \} \\
\{ & 236 & -306 & -147 & 349 & 44 & -362 & 62 & 344 & -163 & -296 & 250 & 223 & -315 & -130 & 353 & 27 & \} \\
\{ & 230 & -319 & -105 & 360 & -35 & -346 & 171 & 280 & -280 & -171 & 346 & 35 & -360 & 105 & 319 & -230 & \} \\
\{ & 223 & -331 & -62 & 361 & -114 & -306 & 262 & 178 & -349 & -9 & 353 & -163 & -274 & 296 & 130 & -359 & \} \\
\{ & 216 & -341 & -18 & 351 & -186 & -243 & 327 & 53 & -358 & 155 & 268 & -311 & -88 & 362 & -122 & -291 & \} \\
\{ & 208 & -349 & 27 & 331 & -250 & -163 & 359 & -79 & -306 & 285 & 114 & -362 & 130 & 274 & -315 & -62 & \} \\
\{ & 201 & -355 & 71 & 301 & -301 & -71 & 355 & -201 & -201 & 355 & -71 & -301 & 301 & 71 & -355 & 201 & \} \\
\{ & 194 & -359 & 114 & 262 & -338 & 27 & 315 & -296 & -62 & 349 & -236 & -147 & 362 & -163 & -223 & 353 & \} \\
\end{Bmatrix}$$

$$
\begin{aligned}
&\{\ 186\ \ -362\ \ 155\ \ 216\ \ -358\ \ 122\ \ 243\ \ -351\ \ 88\ \ 268\ \ -341\ \ 53\ \ 291\ \ -327\ \ 18\ \ 311\ \}\\
&\{\ 178\ \ -362\ \ 194\ \ 163\ \ -361\ \ 208\ \ 147\ \ -359\ \ 223\ \ 130\ \ -357\ \ 236\ \ 114\ \ -353\ \ 250\ \ 97\ \}\\
&\{\ 171\ \ -360\ \ 230\ \ 105\ \ -346\ \ 280\ \ 35\ \ -319\ \ 319\ \ -35\ \ -280\ \ 346\ \ -105\ \ -230\ \ 360\ \ -171\ \}\\
&\{\ 163\ \ -357\ \ 262\ \ 44\ \ -315\ \ 331\ \ -79\ \ -236\ \ 361\ \ -194\ \ -130\ \ 349\ \ -285\ \ -9\ \ 296\ \ -344\ \}\\
&\{\ 155\ \ -351\ \ 291\ \ -18\ \ -268\ \ 358\ \ -186\ \ -122\ \ 341\ \ -311\ \ 53\ \ 243\ \ -362\ \ 216\ \ 88\ \ -327\ \}\\
&\{\ 147\ \ -344\ \ 315\ \ -79\ \ -208\ \ 359\ \ -274\ \ 9\ \ 262\ \ -361\ \ 223\ \ 62\ \ -306\ \ 349\ \ -163\ \ -130\ \}\\
&\{\ 139\ \ -334\ \ 334\ \ -139\ \ -139\ \ 334\ \ -334\ \ 139\ \ 139\ \ -334\ \ 334\ \ -139\ \ -139\ \ 334\ \ -334\ \ 139\ \}\\
&\{\ 130\ \ -323\ \ 349\ \ -194\ \ -62\ \ 285\ \ -361\ \ 250\ \ -9\ \ -236\ \ 359\ \ -296\ \ 79\ \ 178\ \ -344\ \ 331\ \}\\
&\{\ 122\ \ -311\ \ 358\ \ -243\ \ 18\ \ 216\ \ -351\ \ 327\ \ -155\ \ -88\ \ 291\ \ -362\ \ 268\ \ -53\ \ -186\ \ 341\ \}\\
&\{\ 114\ \ -296\ \ 362\ \ -285\ \ 97\ \ 130\ \ -306\ \ 361\ \ -274\ \ 79\ \ 147\ \ -315\ \ 359\ \ -262\ \ 62\ \ 163\ \}\\
&\{\ 105\ \ -280\ \ 360\ \ -319\ \ 171\ \ 35\ \ -230\ \ 346\ \ -346\ \ 230\ \ -35\ \ -171\ \ 319\ \ -360\ \ 280\ \ -105\ \}\\
&\{\ 97\ \ -262\ \ 353\ \ -344\ \ 236\ \ -62\ \ -130\ \ 285\ \ -359\ \ 331\ \ -208\ \ 27\ \ 163\ \ -306\ \ 362\ \ -315\ \}\\
&\{\ 88\ \ -243\ \ 341\ \ -358\ \ 291\ \ -155\ \ -18\ \ 186\ \ -311\ \ 362\ \ -327\ \ 216\ \ -53\ \ -122\ \ 268\ \ -351\ \}\\
&\{\ 79\ \ -223\ \ 323\ \ -362\ \ 331\ \ -236\ \ 97\ \ 62\ \ -208\ \ 315\ \ -361\ \ 338\ \ -250\ \ 114\ \ 44\ \ -194\ \}\\
&\{\ 71\ \ -201\ \ 301\ \ -355\ \ 355\ \ -301\ \ 201\ \ -71\ \ -71\ \ 201\ \ -301\ \ 355\ \ -355\ \ 301\ \ -201\ \ 71\ \}\\
&\{\ 62\ \ -178\ \ 274\ \ -338\ \ 362\ \ -344\ \ 285\ \ -194\ \ 79\ \ 44\ \ -163\ \ 262\ \ -331\ \ 361\ \ -349\ \ 296\ \}\\
&\{\ 53\ \ -155\ \ 243\ \ -311\ \ 351\ \ -362\ \ 341\ \ -291\ \ 216\ \ -122\ \ 18\ \ 88\ \ -186\ \ 268\ \ -327\ \ 358\ \}\\
&\{\ 44\ \ -130\ \ 208\ \ -274\ \ 323\ \ -353\ \ 362\ \ -349\ \ 315\ \ -262\ \ 194\ \ -114\ \ 27\ \ 62\ \ -147\ \ 223\ \}\\
&\{\ 35\ \ -105\ \ 171\ \ -230\ \ 280\ \ -319\ \ 346\ \ -360\ \ 360\ \ -346\ \ 319\ \ -280\ \ 230\ \ -171\ \ 105\ \ -35\ \}\\
&\{\ 27\ \ -79\ \ 130\ \ -178\ \ 223\ \ -262\ \ 296\ \ -323\ \ 344\ \ -357\ \ 362\ \ -359\ \ 349\ \ -331\ \ 306\ \ -274\ \}\\
&\{\ 18\ \ -53\ \ 88\ \ -122\ \ 155\ \ -186\ \ 216\ \ -243\ \ 268\ \ -291\ \ 311\ \ -327\ \ 341\ \ -351\ \ 358\ \ -362\ \}\\
&\{\ 9\ \ -27\ \ 44\ \ -62\ \ 79\ \ -97\ \ 114\ \ -130\ \ 147\ \ -163\ \ 178\ \ -194\ \ 208\ \ -223\ \ 236\ \ -250\ \}\\
&\}
\end{aligned}
$$

$$\text{transMatrix}[m][n] = \text{transMatrixCol16to31}[m-16][n] \quad \text{with } m=16\ldots31,\ n=0\ldots63 \tag{13}$$

$$\text{transMatrixCol16to31} = \tag{14}$$

$$
\begin{aligned}
&\{\\
&\{\ 256\ \ 256\ \ 256\ \ 256\ \ 256\ \ 256\ \ 256\ \ 256\ \ 256\ \ 256\ \ 256\ \ 256\ \ 256\ \ 256\ \ 256\ \ 256\ \}\\
&\{\ 250\ \ 236\ \ 223\ \ 208\ \ 194\ \ 178\ \ 163\ \ 147\ \ 130\ \ 114\ \ 97\ \ 79\ \ 62\ \ 44\ \ 27\ \ 9\ \}\\
&\{\ -18\ \ -53\ \ -88\ \ -122\ \ -155\ \ -186\ \ -216\ \ -243\ \ -268\ \ -291\ \ -311\ \ -327\ \ -341\ \ -351\ \ -358\ \ -362\ \}\\
&\{\ -274\ \ -306\ \ -331\ \ -349\ \ -359\ \ -362\ \ -357\ \ -344\ \ -323\ \ -296\ \ -262\ \ -223\ \ -178\ \ -130\ \ -79\ \ -27\ \}\\
&\{\ -360\ \ -346\ \ -319\ \ -280\ \ -230\ \ -171\ \ -105\ \ -35\ \ 35\ \ 105\ \ 171\ \ 230\ \ 280\ \ 319\ \ 346\ \ 360\ \}\\
&\{\ -223\ \ -147\ \ -62\ \ 27\ \ 114\ \ 194\ \ 262\ \ 315\ \ 349\ \ 362\ \ 353\ \ 323\ \ 274\ \ 208\ \ 130\ \ 44\ \}\\
&\{\ 53\ \ 155\ \ 243\ \ 311\ \ 351\ \ 362\ \ 341\ \ 291\ \ 216\ \ 122\ \ 18\ \ -88\ \ -186\ \ -268\ \ -327\ \ -358\ \}\\
&\{\ 296\ \ 349\ \ 361\ \ 331\ \ 262\ \ 163\ \ 44\ \ -79\ \ -194\ \ -285\ \ -344\ \ -362\ \ -338\ \ -274\ \ -178\ \ -62\ \}\\
&\{\ 355\ \ 301\ \ 201\ \ 71\ \ -71\ \ -201\ \ -301\ \ -355\ \ -355\ \ -301\ \ -201\ \ -71\ \ 71\ \ 201\ \ 301\ \ 355\ \}\\
&\{\ 194\ \ 44\ \ -114\ \ -250\ \ -338\ \ -361\ \ -315\ \ -208\ \ -62\ \ 97\ \ 236\ \ 331\ \ 362\ \ 323\ \ 223\ \ 79\ \}\\
&\{\ -88\ \ -243\ \ -341\ \ -358\ \ -291\ \ -155\ \ 18\ \ 186\ \ 311\ \ 362\ \ 327\ \ 216\ \ 53\ \ -122\ \ -268\ \ -351\ \}\\
&\{\ -315\ \ -362\ \ -306\ \ -163\ \ 27\ \ 208\ \ 331\ \ 359\ \ 285\ \ 130\ \ -62\ \ -236\ \ -344\ \ -353\ \ -262\ \ -97\ \}\\
&\{\ -346\ \ -230\ \ -35\ \ 171\ \ 319\ \ 360\ \ 280\ \ 105\ \ -105\ \ -280\ \ -360\ \ -319\ \ -171\ \ 35\ \ 230\ \ 346\ \}\\
&\{\ -163\ \ 62\ \ 262\ \ 359\ \ 315\ \ 147\ \ -79\ \ -274\ \ -361\ \ -306\ \ -130\ \ 97\ \ 285\ \ 362\ \ 296\ \ 114\ \}\\
&\{\ 122\ \ 311\ \ 358\ \ 243\ \ 18\ \ -216\ \ -351\ \ -327\ \ -155\ \ 88\ \ 291\ \ 362\ \ 268\ \ 53\ \ -186\ \ -341\ \}\\
&\{\ 331\ \ 344\ \ 178\ \ -79\ \ -296\ \ -359\ \ -236\ \ 9\ \ 250\ \ 361\ \ 285\ \ 62\ \ -194\ \ -349\ \ -323\ \ -130\ \}\\
&\{\ 334\ \ 139\ \ -139\ \ -334\ \ -334\ \ -139\ \ 139\ \ 334\ \ 334\ \ 139\ \ -139\ \ -334\ \ -334\ \ -139\ \ 139\ \ 334\ \}\\
&\{\ 130\ \ -163\ \ -349\ \ -306\ \ -62\ \ 223\ \ 361\ \ 262\ \ -7\ \ -274\ \ -359\ \ -208\ \ 79\ \ 315\ \ 344\ \ 147\ \}\\
&\{\ -155\ \ -351\ \ -291\ \ -18\ \ 268\ \ 358\ \ 186\ \ -122\ \ -341\ \ -311\ \ -53\ \ 243\ \ 362\ \ 216\ \ -88\ \ -327\ \}\\
\end{aligned}
$$

| { | −344 | −296 | −9 | 285 | 349 | 130 | −194 | −361 | −236 | 79 | 331 | 315 | 44 | −262 | −357 | −163 | } |
| { | −319 | −35 | 280 | 346 | 105 | −230 | −360 | −171 | 171 | 360 | 230 | −105 | −346 | −280 | 35 | 319 | } |
| { | −97 | 250 | 353 | 114 | −236 | −357 | −130 | 223 | 359 | 147 | −208 | −361 | −163 | 194 | 362 | 178 | } |
| { | 186 | 362 | 155 | −216 | −358 | −122 | 243 | 351 | 88 | −268 | −341 | −53 | 291 | 327 | 18 | −311 | } |
| { | 353 | 223 | −163 | −362 | −147 | 236 | 349 | 62 | −296 | −315 | 27 | 338 | 262 | −114 | −359 | −194 | } |
| { | 301 | −71 | −355 | −201 | 201 | 355 | 71 | −301 | −301 | 71 | 355 | 201 | −201 | −355 | −71 | 301 | } |
| { | 62 | −315 | −274 | 130 | 362 | 114 | −285 | −306 | 79 | 359 | 163 | −250 | −331 | 27 | 349 | 208 | } |
| { | −216 | −341 | 18 | 351 | 186 | −243 | −327 | 53 | 358 | 155 | −268 | −311 | 88 | 362 | 122 | −291 | } |
| { | −359 | −130 | 296 | 274 | −163 | −353 | −9 | 349 | 178 | −262 | −306 | 114 | 361 | 62 | −331 | −223 | } |
| { | −280 | 171 | 346 | −35 | −360 | −105 | 319 | 230 | −230 | −319 | 105 | 360 | 35 | −346 | −171 | 280 | } |
| { | −27 | 353 | 130 | −315 | −223 | 250 | 296 | −163 | −344 | 62 | 362 | 44 | −349 | −147 | 306 | 236 | } |
| { | 243 | 291 | −186 | −327 | 122 | 351 | −53 | −362 | −18 | 358 | 88 | −341 | −155 | 311 | 216 | −268 | } |
| { | 362 | 27 | −359 | −62 | 353 | 97 | −344 | −130 | 331 | 163 | −315 | −194 | 296 | 223 | −274 | −250 | } |
| { | 256 | −256 | −256 | 256 | 256 | −256 | −256 | 256 | 256 | −256 | −256 | 256 | 256 | −256 | −256 | 256 | } |
| { | −9 | −361 | 44 | 357 | −79 | −349 | 114 | 338 | −147 | −323 | 178 | 306 | −208 | −285 | 236 | 262 | } |
| { | −268 | −216 | 311 | 155 | −341 | −88 | 358 | 18 | −362 | 53 | −351 | −122 | −327 | 186 | 291 | −243 | } |
| { | −361 | 79 | 338 | −178 | −285 | 262 | 208 | −323 | −114 | 357 | 9 | −359 | 97 | 331 | −194 | −274 | } |
| { | −230 | 319 | 105 | −360 | 35 | 346 | −171 | −280 | 280 | 171 | −346 | −35 | 360 | −105 | −319 | 230 | } |
| { | 44 | 338 | −208 | −236 | 323 | 79 | −362 | 97 | 315 | −250 | −194 | 344 | 27 | −357 | 147 | 285 | } |
| { | 291 | 122 | −362 | 88 | 311 | −268 | −155 | 358 | −53 | −327 | 243 | 186 | −351 | 18 | 341 | −216 | } |
| { | 357 | −178 | −236 | 338 | 9 | −344 | 223 | 194 | −353 | 44 | 323 | −262 | −147 | 361 | −97 | −296 | } |
| { | 201 | −355 | 71 | 301 | −301 | −71 | 355 | −201 | −201 | 355 | −71 | −301 | 301 | 71 | −355 | 201 | } |

| { | −79 | −285 | 323 | 9 | −331 | 274 | 97 | −357 | 208 | 178 | −361 | 130 | 250 | −344 | 44 | 306 | } |
| { | −311 | −18 | 327 | −291 | −53 | 341 | −268 | −88 | 351 | −243 | −122 | 358 | −216 | −155 | 362 | −186 | } |
| { | −349 | 262 | 79 | −344 | 274 | 62 | −338 | 285 | 44 | −331 | 296 | 27 | −323 | 306 | 9 | −315 | } |
| { | −171 | 360 | −230 | −105 | 346 | −280 | −35 | 319 | −319 | 35 | 280 | −346 | 105 | 230 | −360 | 171 | } |
| { | 114 | 208 | −362 | 223 | 97 | −338 | 306 | −27 | −274 | 353 | −147 | −178 | 359 | −250 | −62 | 323 | } |
| { | 327 | −88 | −216 | 362 | −243 | −53 | 311 | −341 | 122 | 186 | −358 | 268 | 18 | −291 | 351 | −155 | } |
| { | 338 | −323 | 97 | 194 | −357 | 285 | −27 | −250 | 362 | −236 | −44 | 296 | −353 | 178 | 114 | −331 | } |
| { | 139 | −334 | 334 | −139 | −139 | 334 | −334 | 139 | 139 | −334 | 334 | −139 | −139 | 334 | −334 | 139 | } |
| { | −147 | −114 | 315 | −353 | 208 | 44 | −274 | 362 | −262 | 27 | 223 | −357 | 306 | −97 | −163 | 338 | } |
| { | −341 | 186 | 53 | −268 | 362 | −291 | 88 | 155 | −327 | 351 | −216 | −18 | 243 | −358 | 311 | −122 | } |
| { | −323 | 357 | −250 | 44 | 178 | −331 | 353 | −236 | 27 | 194 | −338 | 349 | −223 | 9 | 208 | −344 | } |
| { | −105 | 280 | −360 | 319 | −171 | −35 | 230 | −346 | 346 | −230 | 35 | 171 | −319 | 360 | −280 | 105 | } |
| { | 178 | 9 | −194 | 323 | −361 | 296 | −147 | −44 | 223 | −338 | 357 | −274 | 114 | 79 | −250 | 349 | } |
| { | 351 | −268 | 122 | 53 | −216 | 327 | −362 | 311 | −186 | 18 | 155 | −291 | 358 | −341 | 243 | −88 | } |
| { | 306 | −359 | 344 | −262 | 130 | 27 | −178 | 296 | −357 | 349 | −274 | 147 | 9 | −163 | 285 | −353 | } |
| { | 71 | −201 | 301 | −355 | 355 | −301 | 201 | −71 | −71 | 201 | −301 | 355 | −355 | 301 | −201 | 71 | } |
| { | −208 | 97 | 27 | −147 | 250 | −323 | 359 | −353 | 306 | −223 | 114 | 9 | −130 | 236 | −315 | 357 | } |
| { | −358 | 327 | −268 | 186 | −88 | −18 | 122 | −216 | 291 | −341 | 362 | −351 | 311 | −243 | 155 | −53 | } |
| { | −285 | 331 | −357 | 361 | −344 | 306 | −250 | 178 | −97 | 9 | 79 | −163 | 236 | −296 | 338 | −359 | } |
| { | −35 | 105 | −171 | 230 | −280 | 319 | −346 | 360 | −360 | 346 | −319 | 280 | −230 | 171 | −105 | 35 | } |
| { | 236 | −194 | 147 | −97 | 44 | 9 | −62 | 114 | −163 | 208 | −250 | 285 | −315 | 338 | −353 | 361 | } |
| { | 362 | −358 | 351 | −341 | 327 | −311 | 291 | −268 | 243 | −216 | 186 | −155 | 122 | −88 | 83 | −18 | } |
| { | 262 | −274 | 285 | −296 | 306 | −315 | 323 | −331 | 338 | −344 | 349 | −353 | 357 | −359 | 361 | −362 | } |
} transMatrix[m][n]=(n&1?−1:1)
*transMatrixCol16to31[47−m][n]    (15)

with m=32 . . . 47, n=0 . . . 63 transMatrix[m][n]=(n&1?−1:1)*transMatrixCol0to15
[63−m][n]    (16)

with m=48 . . . 63, n=0 . . . 63

Otherwise, if trType is equal to 1 and nTbs is equal to 4, the following Equation applies:

$$transMatrix[m][n] = \quad (17)$$

{

{ 117  219  296  336 }

{ 296  296   0  −296 }

{ 336  −117  −296  219 }

{ 219  −336  296  −117 }

}

Otherwise, if trType is equal to 1 and nTbs is equal to 8, the following applies:

$$transMatrix[m][n] =$$

$$transMatrix[m][n] = \quad (18)$$

{

{ 65  127  185  237  280  314  338  350 }

{ 185  314  350  280  127  −65  −237  −338 }

{ 280  338  127  −185  −350  −237  65  314 }

{ 338  185  −237  −314  65  350  127  −280 }

{ 350  −65  −338  127  314  −185  −280  237 }

{ 314  −280  −65  338  −237  −127  350  −185 }

{ 237  −350  280  −65  −185  338  −314  127 }

{ 127  −237  314  −350  338  −280  185  −65 }

}

Otherwise, if trType is equal to 1 and nTbs is equal to 16, the following Equation applies:

$$\quad (19)$$

{
{  34   67  100  133  163  193  220  246  269  290  309  324  337  346  353  356 }
{ 100  193  269  324  353  353  324  269  193  100    0  −100 −193 −269 −324 −353 }
{ 163  290  353  337  246  100  −67 −220 −324 −356 −309 −193  −34  133  269  346 }
{ 220  346  324  163  −67 −269 −356 −290 −100  133  309  353  246   34 −193 −337 }
{ 269  353  193 −100 −324 −324 −100  193  353  269    0 −269 −353 −193  100  324 }
{ 309  309    0 −309 −309    0  309  309    0 −309 −309    0  309  309    0 −309 }
{ 337  220 −193 −346  −34  324  246 −163 −353  −67  309  269 −133 −356 −100  290 }
{ 353  100 −324 −193  269  269 −193 −324  100  353    0 −353 −100  324  193 −269 }
{ 356  −34 −353   67  346 −100 −337  133  324 −163 −309  193  290 −220 −269  246 }
{ 346 −163 −269  290  133 −353   34  337 −193 −246  309  100 −356   67  324 −220 }
{ 324 −269 −100  353 −193 −193  353 −100 −269  324    0 −324  269  100 −353  193 }
{ 290 −337  100  220 −356  193  133 −346  269   34 −309  324  −67 −246  353 −163 }
{ 246 −356  269  −34 −220  353 −290   67  193 −346  309 −100 −163  337 −324  133 }
{ 193 −324  353 −269  100  100 −269  353 −324  193    0 −193  324 −353  269 −100 }
{ 133 −246  324 −356  337 −269  163  −34  100  220 −309  353 −346  290 −193   67 }
{  67 −133  193 −246  290 −324  346 −356  353 −337  309 −269  220 −163  100  −34 }
}

Otherwise, if trType is equal to 1 and nTbs is equal to 32, the following Equations apply:

$$\text{transMatrix}[m][n] = \text{transMatrixCol0to15}[m][n] \text{ with } m=0\ldots15, n=0\ldots31 \quad (20)$$

$$\text{transMatrixCol0to15} = \quad (21)$$

{
{  17   35   52   69   86  103  119  135  151  167  182  197  211  225  238  251 }
{  52  103  151  197  238  275  305  329  347  357  359  354  342  322  296  263 }
{  86  167  238  296  336  357  357  336  296  238  167   86    0  −86 −167 −238 }
{ 119  225  305  351  357  322  251  151   35  −86 −197 −285 −342 −359 −336 −275 }
{ 151  275  347  354  296  182   35 −119 −251 −336 −358 −314 −211  −69   86  225 }
{ 182  314  359  305  167  −17 −197 −322 −358 −269 −151   35  211  329  357  285 }
{ 211  342  342  211    0 −211 −342 −342 −211    0  211  342  342  211    0 −211 }
{ 238  357  296   86 −167 −336 −336 −167   86  296  357  238    0 −238 −357 −296 }
{ 263  358  225  −52 −296 −351 −182  103  322  336  135 −151 −342 −314  −86  197 }
{ 285  347  135 −182 −357 −251   52  314  329   86 −225 −359 −211  103  336  305 }
{ 305  322   35 −285 −336  −69  263  347  103 −238 −354 −135  211  358  167 −182 }
{ 322  285  −69 −347 −238  135  358  182 −197 −357 −119  251  342   52 −296 −314 }
{ 336  238 −167 −357  −86  296  296  −86 −357 −167  238  336    0 −336 −238  167 }
{ 347  182 −251 −314   86  359  103 −305 −263  167  351   17 −342 −197  238  322 }
{ 354  119 −314 −225  238  305 −135 −351   17  357  103 −322 −211  251  296 −151 }
{ 358   52 −351 −103  336  151 −314 −197  285  238 −251 −275  211  305 −167 −329 }
{ 359  −17 −358   35  357  −52 −354   69  351  −86 −347  103  342 −119 −336  135 }
{ 357  −86 −336  167  296 −238 −238  296  167 −336  −86  357    0 −357   86  336 }
{ 351 −151 −285  275  167 −347  −17  354 −135 −296  263  182 −342  −35  357 −119 }
{ 342 −211 −211  342    0 −342  211  211 −342    0  342 −211 −211  342    0 −342 }
{ 329 −263 −119  358 −167 −225  347  −52 −305  296   69 −351  211  182 −357  103 }
{ 314 −305  −17  322 −296  −35  329 −285  −52  336 −275  −69  342 −263  −86  347 }
{ 296 −336   86  238 −357  167  167 −357  238   86 −336  296    0 −296  336  −86 }
{ 275 −354  182  119 −336  314  −69 −225  359 −238  −52  305 −342  135  167 −351 }
{ 251 −359  263  −17 −238  358 −275   35  225 −357  285  −52 −211  354 −296   69 }
{ 225 −351  322 −151  −86  285 −359  275  −69 −167  329 −347  211   17 −238  354 }
{ 197 −329  354 −263   86  119 −285  358 −314  167   35 −225  342 −347  238  −52 }
{ 167 −296  357 −336  238  −86  −86  238 −336  357 −296  167    0 −167  296 −357 }
{ 135 −251  329 −359  336 −263  151  −17 −119  238 −322  358 −342  275 −167   35 }
{ 103 −197  275 −329  357 −354  322 −263  182  −86  −17  119 −211  285 −336  358 }
{  69 −135  197 −251  296 −329  351 −359  354 −336  305 −263  211 −151   86  −17 }
{  35  −69  103 −135  167 −197  225 −251  275 −296  314 −329  342 −351  357 −359 }
}

$$\text{transMatrix}[m][n] = \text{transMatrixCol6to31}[m-16][n] \text{ with } m=16\ldots31, n=0\ldots31 \quad (22)$$

$$transMatrixCol16to31 = \qquad (23)$$

$$\begin{Bmatrix}
\{ & 263 & 275 & 285 & 296 & 305 & 314 & 322 & 329 & 336 & 342 & 347 & 351 & 354 & 357 & 358 & 359 & \} \\
\{ & 225 & 182 & 135 & 86 & 35 & -17 & -69 & -119 & -167 & -211 & -251 & -285 & -314 & -336 & -351 & -358 & \} \\
\{ & -296 & -336 & -357 & -357 & -336 & -296 & -238 & -167 & -86 & 0 & 86 & 167 & 238 & 296 & 336 & 357 & \} \\
\{ & -182 & -69 & 52 & 167 & 263 & 329 & 358 & 347 & 296 & 211 & 103 & -17 & -135 & -238 & -314 & -354 & \} \\
\{ & 322 & 359 & 329 & 238 & 103 & -52 & -197 & -305 & -357 & -342 & -263 & -135 & 17 & 167 & 285 & 351 & \} \\
\{ & 135 & -52 & -225 & -336 & -354 & -275 & -119 & 69 & 238 & 342 & 351 & 263 & 103 & -86 & -251 & -347 & \} \\
\{ & -342 & -342 & -211 & 0 & 211 & 342 & 342 & 211 & 0 & -211 & -342 & -342 & -211 & 0 & 211 & 342 & \} \\
\{ & -86 & 167 & 336 & 336 & 167 & -86 & -296 & -357 & -238 & 0 & 238 & 357 & 296 & 86 & -167 & -336 & \} \\
\{ & 354 & 285 & 35 & -238 & -359 & -251 & 17 & 275 & 357 & 211 & -69 & -305 & -347 & -167 & 119 & 329 & \} \\
\{ & 35 & -263 & -354 & -167 & 151 & 351 & 275 & -17 & -296 & -342 & -119 & 197 & 358 & 238 & -69 & -322 & \} \\
\{ & -359 & -197 & 151 & 357 & 225 & -119 & -351 & -251 & 86 & 342 & 275 & -52 & -329 & -296 & 17 & 314 & \} \\
\{ & 17 & 329 & 275 & -86 & -351 & -225 & 151 & 359 & 167 & -211 & -354 & -103 & 263 & 336 & 35 & -305 & \} \\
\{ & 357 & 86 & -296 & -296 & 86 & 357 & 167 & -238 & -336 & 0 & 336 & 238 & -167 & -357 & -86 & 296 & \} \\
\{ & -69 & -358 & -119 & 296 & 275 & -151 & -354 & -35 & 336 & 211 & -225 & -329 & 52 & 357 & 135 & -285 & \} \\
\{ & -347 & 35 & 358 & 86 & -329 & -197 & 263 & 285 & -167 & -342 & 52 & 359 & 69 & -336 & -182 & 275 & \} \\
\{ & 119 & 347 & -69 & -357 & 17 & 359 & 35 & -354 & -86 & 342 & 135 & -322 & -182 & 296 & 225 & -263 & \} \\
\{ & 329 & -151 & -322 & 167 & 314 & -182 & -305 & 197 & 296 & -211 & -285 & 225 & 275 & -238 & -263 & 251 & \} \\
\{ & -167 & -296 & 238 & 238 & -296 & -167 & 336 & 86 & -357 & 0 & 357 & -86 & -336 & 167 & 296 & -238 & \} \\
\{ & -305 & 251 & 197 & -336 & -52 & 358 & -103 & -314 & 238 & 211 & -329 & -69 & 359 & -86 & -322 & 225 & \} \\
\{ & 211 & 211 & -342 & 0 & 342 & -211 & -211 & 342 & 0 & -342 & 211 & 211 & -342 & 0 & 342 & -211 & \} \\
\{ & 275 & -322 & -17 & 336 & -251 & -135 & 359 & -151 & -238 & 342 & -35 & -314 & 285 & 86 & -354 & 197 & \} \\
\{ & -251 & -103 & 351 & -238 & -119 & 354 & -225 & -135 & 357 & -211 & -151 & 358 & -197 & -167 & 359 & -182 & \} \\
\{ & -238 & 357 & -167 & -167 & 357 & -238 & -86 & 336 & -296 & 0 & 296 & -336 & 86 & 238 & -357 & 167 & \} \\
\{ & 285 & -17 & -263 & 357 & -197 & -103 & 329 & -322 & 86 & 211 & -358 & 251 & 35 & -296 & 347 & -151 & \} \\
\{ & 197 & -351 & 305 & -86 & -182 & 347 & -314 & 103 & 167 & -342 & 322 & -119 & -151 & 336 & -329 & 135 & \} \\
\{ & -314 & 135 & 103 & -296 & 358 & -263 & 52 & 182 & -336 & 342 & -197 & -35 & 251 & -357 & 305 & -119 & \} \\
\{ & -151 & 305 & -359 & 296 & -135 & -69 & 251 & -351 & 336 & -211 & 17 & 182 & -322 & 357 & -275 & 103 & \} \\
\{ & 336 & -238 & 86 & 86 & -238 & 336 & -357 & 296 & -167 & 0 & 167 & -296 & 357 & -336 & 238 & -86 & \} \\
\{ & 103 & -225 & 314 & -357 & 347 & -285 & 182 & -52 & -86 & 211 & -305 & 354 & -351 & 296 & -197 & 69 & \} \\
\{ & -351 & 314 & -251 & 167 & -69 & -35 & 135 & -225 & 296 & -342 & 359 & -347 & 305 & -238 & 151 & -52 & \} \\
\{ & -52 & 119 & -182 & 238 & -285 & 322 & -347 & 358 & -357 & 342 & -314 & 275 & -225 & 167 & -103 & 35 & \} \\
\{ & 358 & -354 & 347 & -336 & 322 & -305 & 285 & -263 & 238 & -211 & 182 & -151 & 119 & -86 & 52 & -17 & \} \\
\}
\end{Bmatrix}$$

Otherwise, if trType is equal to 2 and nTbs is equal to 4, the following Equation applies:

$$transMatrix[m][n] = \qquad (24)$$

$$\begin{Bmatrix}
\{ 336 & 296 & 219 & 117 \} \\
\{ 296 & 0 & -296 & -296 \} \\
\{ 219 & -296 & -117 & 336 \} \\
\{ 117 & -296 & 336 & -219 \} \\
\{ 512 & 0 & 0 & 0 \} \\
\{ 0 & 512 & 0 & 0 \} \\
\{ 0 & 0 & 512 & 0 \} \\
\{ 0 & 0 & 0 & 512 \} \\
\}
\end{Bmatrix}$$

Otherwise, if trType is equal to 2 and nTbs is equal to 8, the following Equation applies:

$$transMatrix[m][n] = \qquad (25)$$

$$\{$$
$$\{ 350 \ 338 \ 314 \ 280 \ 237 \ 185 \ 127 \ 65 \}$$
$$\{ 338 \ 237 \ 65 \ -127 \ -280 \ -350 \ -314 \ -185 \}$$
$$\{ 314 \ 65 \ -237 \ -350 \ -185 \ 127 \ 338 \ 280 \}$$

-continued

{ 280 −127 −350 −65 314 237 −185 −338 }
{ 237 −280 −185 314 127 −338 −65 350 }
{ 185 −350 127 237 −338 65 280 −314 }
{ 127 −314 338 −185 −65 280 −350 237 }
{ 65 −185 280 −338 350 −314 237 127 }
}

Otherwise, if trType is equal to 2 and nTbs is equal to 16, the following applies:

$$transMatrix[m][n] = \qquad (26)$$

{
{ 356 353 346 337 324 309 290 269 246 220 193 163 133 100 67 34 }
{ 353 324 269 193 100 0 −100 −193 −269 −324 −353 −353 −324 −269 −193 −100 }
{ 346 269 133 −34 −193 −309 −356 −324 −220 −67 100 246 337 353 290 163 }
{ 337 193 −34 −246 −353 −309 −133 100 290 356 296 67 −163 −324 −346 −220 }
{ 324 100 −193 −353 −269 0 269 353 193 −100 −324 −324 −100 193 353 269 }
{ 309 0 −309 −309 0 309 309 0 −309 −309 0 309 309 0 −309 −309 }
{ 290 −100 −356 −133 269 309 −67 −353 −163 246 324 −34 −346 −193 220 337 }
{ 269 −193 −324 100 353 0 −353 −100 324 193 −269 −269 193 324 −100 −353 }
{ 246 −269 −220 290 193 −309 −163 324 133 −337 −100 346 67 −353 −34 356 }
{ 220 −324 −67 356 −100 −309 246 193 −337 −34 353 −133 −290 269 163 −346 }
{ 193 −353 100 269 −324 0 324 −269 −100 353 −193 −193 353 −100 −269 324 }
{ 163 −353 246 67 −324 309 −34 −269 346 −133 −193 356 −220 −100 337 −290 }
{ 133 −324 337 −163 −100 309 −346 193 67 −290 353 −220 −34 269 −356 246 }
{ 100 −269 353 −324 193 0 −193 324 −353 269 −100 −100 269 −353 324 −193 }
{ 67 −193 290 −346 353 −309 220 −100 −34 163 −269 337 −356 324 −246 133 }
{ 34 −100 163 −220 269 −309 337 −353 356 346 324 −290 246 −193 133 −67 }
}

Otherwise, if trType is equal to 2 and nTbs is equal to 32, the following applies:

transMatrix[m][n]=transMatrixCol0to15[m][n] with
m=0 . . . 15,n=0 . . . 31 (27)

$transMatrixCol0to15 =$ (28)

{
{ 359  358  357  354  351  347  342  336  329  322  314  305  296  385  275  263 }
{ 358  351  336  314  285  251  211  167  119   69   17  −35  −86 −135 −182 −225 }
{ 357  336  296  238  167   86    0  −86 −167 −238 −296 −336 −357 −357 −336 −296 }
{ 354  314  238  135   17 −103 −211 −296 −347 −358 −329 −263 −167  −52   69  182 }
{ 351  285  167   17 −135 −263 −342 −357 −305 −197  −52  103  238  329  359  322 }
{ 347  251   86 −103 −263 −351 −342 −238  −69  119  275  354  336  225   52 −135 }
{ 342  211    0 −211 −342 −342 −211    0  211  342  342  211    0 −211 −342 −342 }
{ 336  167  −86 −296 −357 −238    0  238  357  296   86 −167 −336 −336 −167   86 }
{ 329  119 −167 −347 −305  −69  211  357  275   17 −251 −359 −238   35  285  354 }
{ 322   69 −238 −358 −197  119  342  296   17 −275 −351 −151  167  354  263  −35 }
{ 314   17 −296 −329  −52  275  342   86 −251 −351 −119  225  357  151 −197 −359 }
{ 305  −35 −336 −263  103  354  211 −167 −359 −151  225  351   86 −275 −329  −17 }
{ 296  −86 −357 −167  238  336    0 −336 −238  167  357   86 −296 −296   86  357 }
{ 285 −135 −357  −52  329  225 −211 −336   35  354  151 −275 −296  119  358   69 }
{ 275 −182 −336   69  359   52 −342 −167  285  263 −197 −329   86  358   35 −347 }
{ 263 −225 −296  182  322 −135 −342   86  354  −35 −359  −17  357   69 −347 −119 }
{ 251 −263 −238  275  225 −285 −211  296  197 −305 −182  314  167 −322 −151  329 }
{ 238 −296 −167  336   86 −357    0  357  −86 −336  167  296 −238 −238  296  167 }
{ 225 −322  −86  359  −69 −329  211  238 −314 −103  358  −52 −336  197  251 −305 }
{ 211 −342    0  342 −211 −211  342    0 −342  211  211 −342    0  342 −211 −211 }
{ 197 −354   86  285 −314  −35  342 −238 −151  359 −135 −251  336  −17 −322  275 }
{ 182 −359  167  197 −358  151  211 −357  135  225 −354  119  238 −351  103  251 }
{ 167 −357  238   86 −336  296    0 −296  336  −86 −238  357 −167 −167  357 −238 }
{ 151 −347  296  −35 −251  358 −211  −86  322 −329  103  197 −357  263   17 −285 }
{ 135 −329  336 −151 −119  322 −342  167  103 −314  347 −182  −86  305 −351  197 }
{ 119 −305  357 −251   35  197 −342  336 −182  −52  263 −358  296 −103 −135  314 }
{ 103 −275  357 −322  182   17 −211  336 −351  251  −69 −135  296 −359  305 −151 }
{  86 −238  336 −357  296 −167    0  167 −296  357 −336  238  −86  −86  238 −336 }
{  69 −197  296 −351  354 −305  211  −86  −52  182 −285  347 −357  314 −225  103 }
{  52 −151  238 −305  347 −359  342 −296  225 −135   35   69 −167  251 −314  351 }
{  35 −103  167 −225  275 −314  342 −357  358 −347  322 −285  238 −182  119  −52 }
{  17  −52   86 −119  151 −182  211 −238  263 −285  305 −322  336 −347  354 −358 }
}

$transMatrix[m][n] = transMatrixCol16to31[m-16][n]$
with $m = 16 \ldots 31, n = 0 \ldots 31$ (29)

$transMatrixCol16to31 =$ (30)

$$\begin{Bmatrix}
\{ & 251 & 238 & 225 & 211 & 197 & 182 & 167 & 151 & 135 & 119 & 103 & 86 & 69 & 52 & 35 & 17 & \} \\
\{ & -263 & -296 & -322 & -342 & -354 & -359 & -357 & -347 & -329 & -305 & -275 & -238 & -197 & -151 & -103 & -52 & \} \\
\{ & -238 & -167 & -86 & 0 & 86 & 167 & 238 & 296 & 336 & 357 & 357 & 336 & 296 & 238 & 167 & 86 & \} \\
\{ & 275 & 336 & 359 & 342 & 285 & 197 & 86 & -35 & -151 & -251 & -322 & -357 & -351 & -305 & -225 & -119 & \} \\
\{ & 225 & 86 & -69 & -211 & -314 & -358 & -336 & -251 & -119 & 35 & 182 & 296 & 354 & 347 & 275 & 151 & \} \\
\{ & -285 & -357 & -329 & -211 & -35 & 151 & 296 & 358 & 322 & 197 & 17 & -167 & -305 & -359 & -314 & -182 & \} \\
\{ & -211 & 0 & 211 & 342 & 342 & 211 & 0 & -211 & -342 & -342 & -211 & 0 & 211 & 342 & 342 & 211 & \} \\
\{ & 296 & 357 & 238 & 0 & -238 & -357 & -296 & -86 & 167 & 336 & 336 & 167 & -86 & -296 & -357 & -238 & \} \\
\{ & 197 & -86 & -314 & -342 & -151 & 135 & 336 & 322 & 103 & -182 & -351 & -296 & -52 & 225 & 358 & 263 & \} \\
\{ & -305 & -336 & -103 & 211 & 359 & 225 & -86 & -329 & -314 & -52 & 251 & 357 & 182 & -135 & -347 & -285 & \} \\
\{ & -182 & 167 & 358 & 211 & -135 & -354 & -238 & 103 & 347 & 263 & -69 & -336 & -285 & 35 & 322 & 305 & \} \\
\{ & 314 & 296 & -52 & -342 & -251 & -119 & 357 & 197 & -182 & -358 & -135 & 238 & 347 & 69 & -285 & -322 & \} \\
\{ & 167 & -238 & -336 & 0 & 336 & 238 & -167 & -357 & -86 & 296 & 296 & -86 & -357 & -167 & 238 & 336 & \} \\
\{ & -322 & -238 & 197 & 342 & -17 & -351 & -167 & 263 & 305 & -103 & -359 & -86 & 314 & 251 & -182 & -347 & \} \\
\{ & -151 & 296 & 251 & -211 & -322 & 103 & 357 & 17 & -351 & -135 & 305 & 238 & -225 & -314 & 119 & 354 & \} \\
\{ & 329 & 167 & -305 & -211 & 275 & 251 & -238 & -285 & 197 & 314 & -151 & -336 & 103 & 351 & -52 & -358 & \} \\
\{ & 135 & -336 & -119 & 342 & 103 & -347 & -86 & 351 & 69 & -354 & -52 & 357 & 35 & -358 & -17 & 359 & \} \\
\{ & -336 & -86 & 357 & 0 & -357 & 86 & 336 & -167 & -296 & 238 & 238 & -296 & -167 & 336 & 86 & -357 & \} \\
\{ & -119 & 357 & -35 & -342 & 182 & 263 & -296 & -135 & 354 & -17 & -347 & 167 & 275 & -285 & 151 & 351 & \} \\
\{ & 342 & 0 & -342 & 211 & 211 & -342 & 0 & 342 & -211 & -211 & 342 & 0 & -342 & 211 & 211 & -342 & \} \\
\{ & 103 & -357 & 182 & 211 & -351 & 69 & 296 & -305 & -52 & 347 & -225 & -167 & 358 & -119 & -263 & 329 & \} \\
\{ & -347 & 86 & 263 & -342 & 69 & 275 & -336 & 52 & 285 & -329 & 35 & 296 & -322 & 17 & 305 & -314 & \} \\
\{ & -86 & 336 & -296 & 0 & 296 & -336 & 86 & 238 & -357 & 167 & 167 & -357 & 238 & 86 & -336 & 296 & \} \\
\{ & 351 & -167 & -135 & 342 & -305 & 52 & 238 & -359 & 225 & 69 & -314 & 336 & -119 & -182 & 354 & -275 & \} \\
\{ & 69 & -296 & 354 & -211 & -52 & 285 & -357 & 225 & 35 & -275 & 358 & -238 & -17 & 263 & -359 & 251 & \} \\
\{ & -354 & 238 & -17 & -211 & 347 & -329 & 167 & 69 & -275 & 359 & -285 & 86 & 151 & -322 & 351 & -225 & \} \\
\{ & -52 & 238 & -347 & 342 & -225 & 35 & 167 & -314 & 358 & -285 & 119 & 86 & -263 & 354 & -329 & 197 & \} \\
\{ & 357 & -296 & 167 & 0 & -167 & 296 & -357 & 336 & -238 & 86 & 86 & -238 & 336 & -357 & 296 & -167 & \} \\
\{ & 35 & -167 & 275 & -342 & 358 & -322 & 238 & -119 & -17 & 151 & -263 & 336 & -359 & 329 & -251 & 135 & \} \\
\{ & -358 & 336 & -285 & 211 & -119 & 17 & 86 & -182 & 263 & -322 & 354 & -357 & 329 & -275 & 197 & -103 & \} \\
\{ & -17 & 86 & -151 & 211 & -263 & 305 & -336 & 354 & -359 & 351 & -329 & 296 & -251 & 197 & -135 & 69 & \} \\
\{ & 359 & -357 & 351 & -342 & 329 & -314 & 296 & -275 & 251 & -225 & 197 & -167 & 135 & -103 & 69 & -35 & \} \\
\end{Bmatrix}$$

Figure 6:
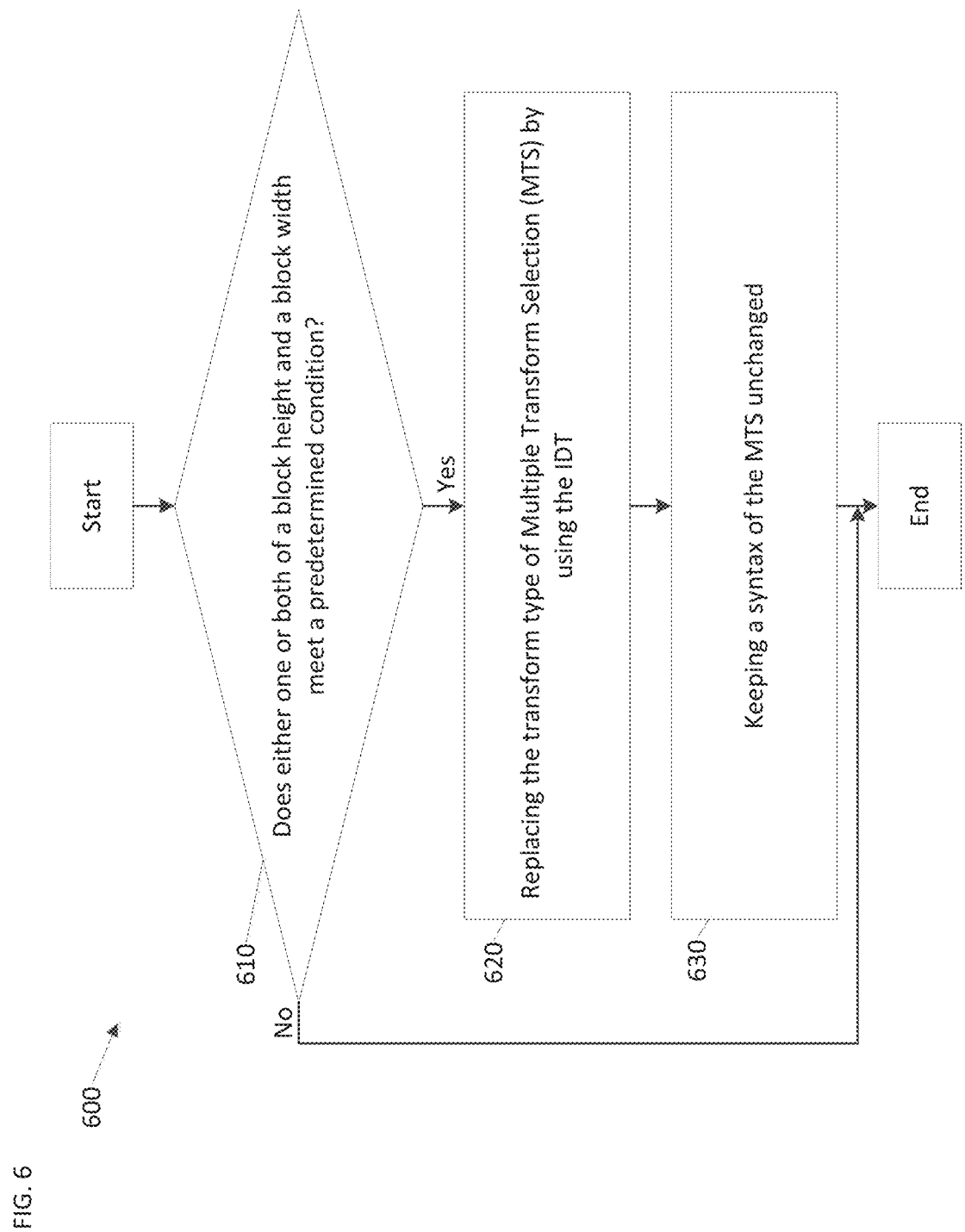
FIG. 6 is a flowchart illustrating a method of controlling residual coding for decoding or encoding of a video sequence, according to an embodiment.

FIG. 6 is a flowchart illustrating a method (600) of controlling residual coding for decoding or encoding of a video sequence, according to an embodiment. In some implementations, one or more process blocks of FIG. 6 may be performed by the decoder (310). In some implementations, one or more process blocks of FIG. 6 may be performed by another device or a group of devices separate from or including the decoder (310), such as the encoder (303).

Referring to FIG. 6, in a first block (610), the method (600) includes determining whether to replace a transform type of Multiple Transform Selection (MTS) by using Identity transform (IDT). Based on whether either one or both of a block height and a block width meet a predetermined condition (610—No), the method (600) ends.

In a second block (620), the method (600) includes, based on either one or both of the block height and the block width meeting the predetermined condition, replacing the transform type of MTS by using the IDT (610—Yes).

In a third block (630), the method (600) includes keeping a syntax of the MTS unchanged.

The determining whether the first intra prediction direction of the luma coding block is aligned with the second intra prediction direction of the chroma coding block may include determining that the first intra prediction direction is aligned with the second intra prediction direction, based on both the first intra prediction direction and the second intra prediction direction corresponding to one of angular prediction modes, a planar mode and a DC mode.

The transform type of the MTS may be discrete cosine transform DCT-4 or DCT-8.

Figure 7:
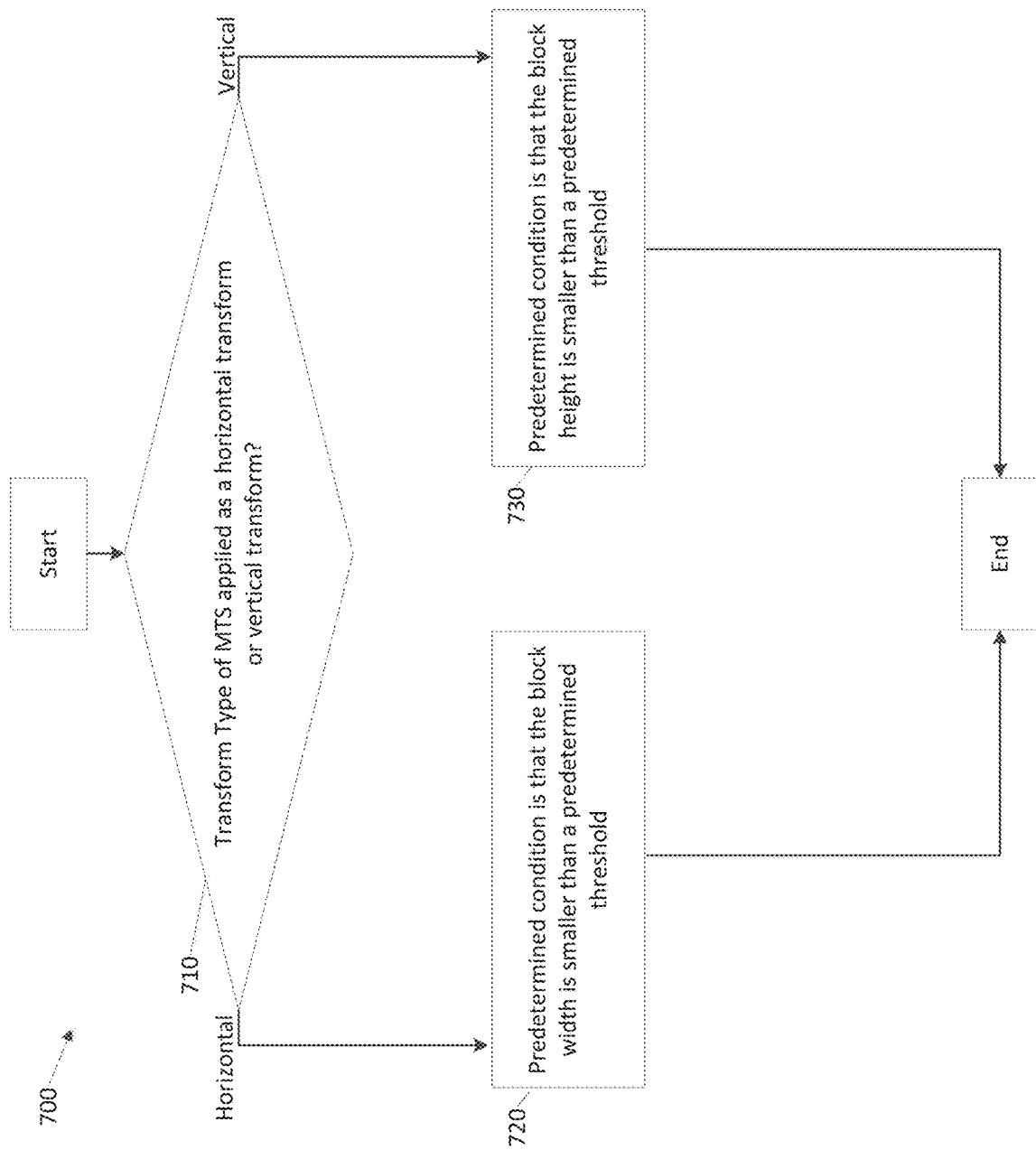
FIG. 7 is a flowchart illustrating a method of controlling residual coding for decoding or encoding of a video sequence, according to an embodiment.

FIG. 7 is a flowchart illustrating a method (700) of controlling residual coding for decoding or encoding of a video sequence, according to another embodiment. In some implementations, one or more process blocks of FIG. 7 may be performed by the decoder (310). In some implementations, one or more process blocks of FIG. 7 may be performed by another device or a group of devices separate from or including the decoder (310), such as the encoder (303).

Referring to FIG. 7, in a first block (710), the method (700) includes determining whether the transform type of the MTS is applied as a horizontal transform or a vertical transform.

Based on the transform type of the MTS being applied as a horizontal transform (710—Horizontal), the method (700) includes, in a second block (720), the predetermined condition is that the block width is smaller than a predetermined threshold.

Based on the transform type of the MTS being applied as a vertical transform (710—Vertical), the method (700) includes, in a third block (730), the predetermined condition is that the block height is smaller than a predetermined threshold.

The predetermined threshold may be one from among 2, 4, 8, 16, 32, 64, 128, and 156.

The predetermined condition may be that the transform type of the MTS is used on a horizontal direction or a vertical direction, but is not used on both the horizontal direction and the vertical direction.

Although FIGS. 6 and 7 show example blocks of the methods (600) and (700), in some implementations, the methods (600) and (700) may include additional blocks, fewer blocks, different blocks, or differently arranged blocks than those depicted in FIGS. 6 and 7. Additionally, or alternatively, two or more of the blocks of the methods (600) and (700) may be performed in parallel.

Further, the proposed methods may be implemented by processing circuitry (e.g., one or more processors or one or more integrated circuits). In an example, the one or more processors execute a program that is stored in a non-transitory computer-readable medium to perform one or more of the proposed methods.

Figure 8:
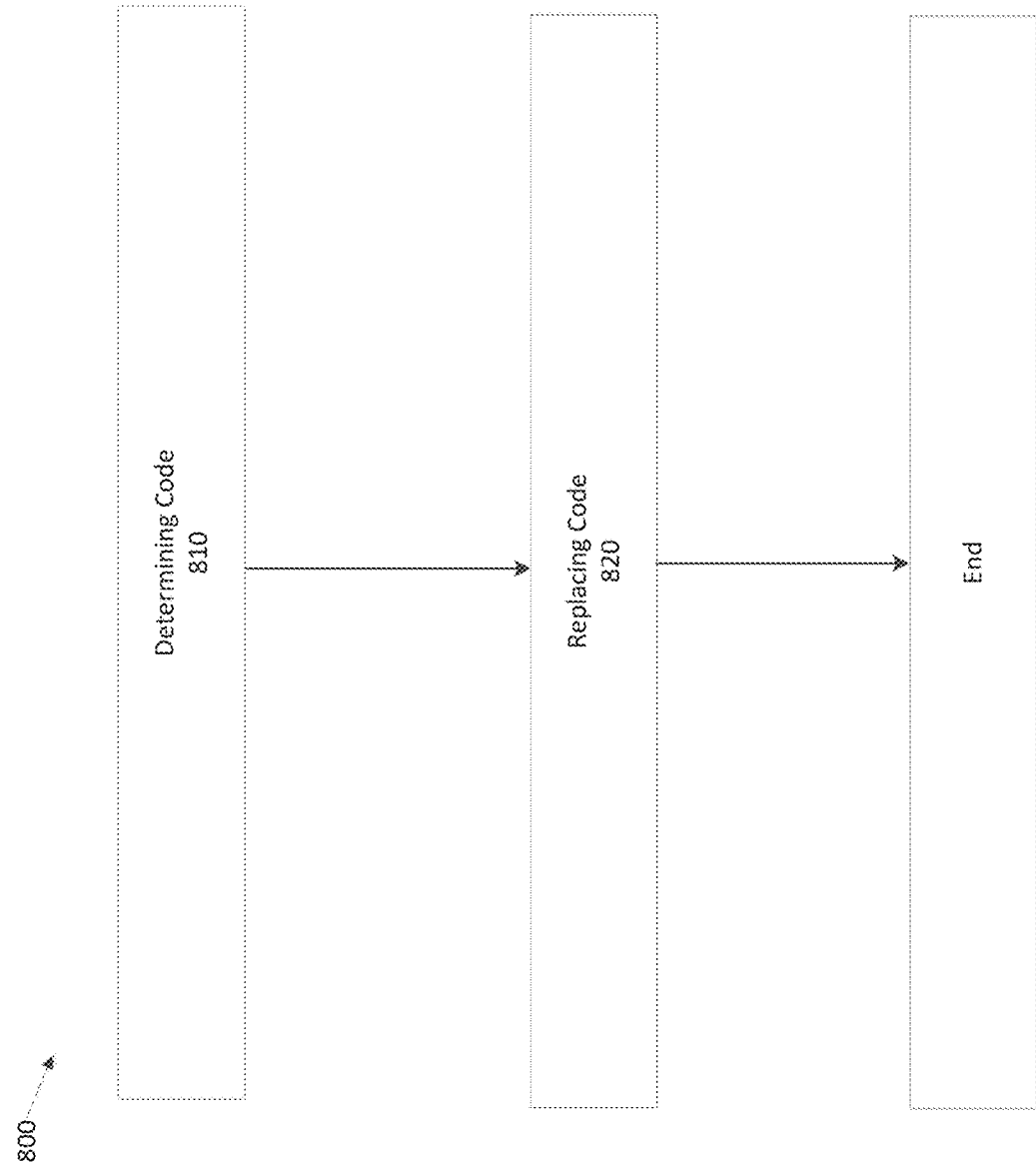
FIG. 8 is a simplified block diagram of an apparatus for controlling residual coding for decoding or encoding of a video sequence, according to an embodiment.

FIG. 8 is a simplified block diagram of an apparatus (800) for controlling residual coding for decoding or encoding of a video sequence, according to an embodiment.

Referring to FIG. 8, the apparatus (800) includes determining code (810) and replacing code (820).

The determining code (810) is configured to cause at least one processor to determine whether to replace a transform type of Multiple Transform Selection (MTS) by using Identity transform (IDT), based on whether either one or both of a block height and a block width meet a predetermined condition.

The replacing code (820) is configured to cause the at least one processor to, based on either one or both of the block height and the block width meeting the predetermined condition, replace the transform type of Multiple Transform Selection (MTS) by using the IDT and keeping a syntax of the MTS unchanged.

The techniques described above, can be implemented as computer software using computer-readable instructions and physically stored in one or more computer-readable media.

Figure 9:
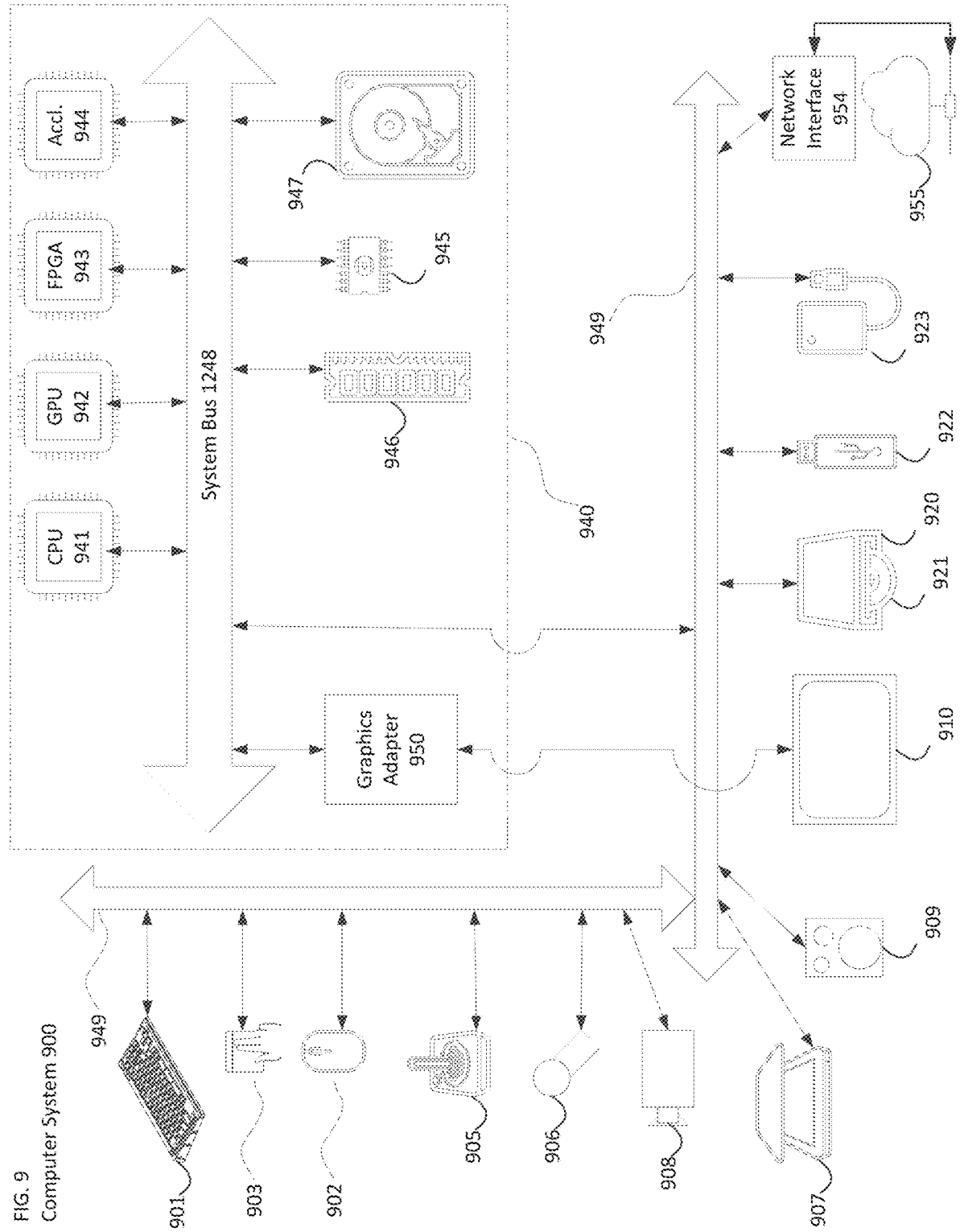
FIG. 9 is a diagram of a computer system suitable for implementing embodiments.

FIG. 9 is a diagram of a computer system (900) suitable for implementing embodiments.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 9 for computer system (900) are exemplary in nature and are not intended to suggest any limitation as to the scope of use or functionality of the computer software implementing embodiments. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (904), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (904), or joystick (905), but there can also be tactile feedback devices that do not serve as input devices), audio output devices (such as: speakers (909), headphones (not depicted)), visual output devices (such as screens (910) to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses ((949)) (such as, for example universal serial bus (USB) ports of the computer system (900); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, and so forth. These devices, along with Read-only memory (ROM) (945), Random-access memory (RAM) (946), internal mass storage such as internal non-user accessible hard drives, solid-state drives (SSDs), and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include peripheral component interconnect (PCI), USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of embodiments, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. Embodiments encompass any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method of controlling residual coding for decoding or encoding of a video sequence, the method being performed by at least one processor, and the method comprising:
   determining whether to replace a transform type of Multiple Transform Selection (MTS) by using Identity transform (IDT), based on determining whether either one or both of a block height and a block width meet a predetermined condition; and
   based on determining that either one or both of the block height and the block width meet the predetermined condition, replacing the transform type of MTS by using the IDT and keeping a syntax of the MTS unchanged,
   wherein the IDT is a linear transform process using an N×N transform core in which each coefficient of a main diagonal of the N×N transform core is non-zero and each coefficient of the N×N transform core, other than the main diagonal, is zero, and wherein N is an integer.

2. The method of claim 1, wherein the transform type of the MTS is discrete cosine transform DCT-4 or DCT-8.

3. The method of claim 1, wherein the transform type of the MTS is applied as a horizontal transform and the predetermined condition is that the block width is smaller than a predetermined threshold.

4. The method of claim 3, wherein the predetermined threshold is one from among 2, 4, 8, 16, 32, 64, 128, and 156.

5. The method of claim 1, wherein the transform type of the MTS is applied as a vertical transform and the predetermined condition is that the block height is smaller than a predetermined threshold.

6. The method of claim 5, wherein the predetermined threshold is one from among 2, 4, 8, 16, 32, 64, 128, and 156.

7. The method of claim 1, wherein the predetermined condition is that the transform type of the MTS is used on a horizontal direction or a vertical direction, but is not used on both the horizontal direction and the vertical direction.

8. An apparatus for controlling residual coding for decoding or encoding of a video sequence, the apparatus comprising:
- at least one non-transitory computer readable medium that stores computer program code; and
- at least one processor configured to access the at least one non-transitory computer readable medium and operate according to the computer program code, the computer program code comprising:
- determining code configured to cause the at least one processor to determine whether to replace a transform type of Multiple Transform Selection (MTS) by using Identity transform (IDT), based on determining whether either one or both of a block height and a block width meet a predetermined condition; and
- replacing code configured to cause the at least one processor to, based on determining that either one or both of the block height and the block width meet the predetermined condition, replace the transform type of MTS by using the IDT and keeping a syntax of the MTS unchanged,
- wherein the IDT is a linear transform process using an N×N transform core in which each coefficient of a main diagonal of the N×N transform core is non-zero and each coefficient of the N×N transform core, other than the main diagonal, is zero, and wherein N is an integer.

9. The apparatus of claim 8, wherein the transform type of the MTS is discrete cosine transform DCT-4 or DCT-8.

10. The apparatus of claim 8, wherein the transform type of the MTS is applied as a horizontal transform and the predetermined condition is that the block width is smaller than a predetermined threshold.

11. The apparatus of claim 10, wherein the predetermined threshold is one from among 2, 4, 8, 16, 32, 64, 128, and 156.

12. The apparatus of claim 8, wherein the transform type of the MTS is applied as a vertical transform and the predetermined condition is that the block height is smaller than a predetermined threshold.

13. The apparatus of claim 12, wherein the predetermined threshold is one from among 2, 4, 8, 16, 32, 64, 128, and 156.

14. The apparatus of claim 8, wherein the predetermined condition is that the transform type of the MTS is used on a horizontal direction or a vertical direction, but is not used on both the horizontal direction and the vertical direction.

15. A non-transitory computer-readable storage medium storing instructions that cause at least one processor to:
- determine whether to replace a transform type of Multiple Transform Selection (MTS) by using Identity transform (IDT), based on determining whether either one or both of a block height and a block width meet a predetermined condition; and
- based on determining that either one or both of the block height and the block width meet the predetermined condition, replace the transform type of MTS by using the IDT and keeping a syntax of the MTS unchanged,
- wherein the IDT is a linear transform process using an N×N transform core in which each coefficient of a main diagonal of the N×N transform core is non-zero and each coefficient of the N×N transform core, other than the main diagonal, is zero, and wherein N is an integer.

16. The non-transitory computer-readable storage medium of claim 15, wherein the transform type of the MTS is discrete cosine transform DCT-4 or DCT-8.

17. The non-transitory computer-readable storage medium of claim 15, wherein the transform type of the MTS is applied as a horizontal transform and the predetermined condition is that the block width is smaller than a predetermined threshold.

18. The non-transitory computer-readable storage medium of claim 17, wherein the predetermined threshold is one from among 2, 4, 8, 16, 32, 64, 128, and 156.

19. The non-transitory computer-readable storage medium of claim 15, wherein the transform type of the MTS is applied as a vertical transform and the predetermined condition is that the block height is smaller than a predetermined threshold.

20. The non-transitory computer-readable storage medium of claim 19, wherein the predetermined threshold is one from among 2, 4, 8, 16, 32, 64, 128, and 156.

* * * * *